(12) United States Patent
Desai et al.

(10) Patent No.: US 10,006,432 B2
(45) Date of Patent: Jun. 26, 2018

(54) DUAL COIL IGNITION SYSTEM

(71) Applicant: Cummins, Inc., Columbus, IN (US)

(72) Inventors: Akash S. Desai, Columbus, IN (US); Karthik Kappaganthu, Bloomington, IN (US); Benjamin L. Olivas, Columbus, IN (US); Douglas L. Sprunger, Columbus, IN (US); David Stroh, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days. days.

(21) Appl. No.: 15/236,545

(22) Filed: Aug. 15, 2016

(65) Prior Publication Data

US 2016/0348634 A1 Dec. 1, 2016

Related U.S. Application Data

(63) Continuation of application No. 14/558,261, filed on Dec. 2, 2014, now Pat. No. 9,429,134.

(60) Provisional application No. 61/911,962, filed on Dec. 4, 2013.

(51) Int. Cl.
| | |
|---|---|
| *F02P 3/04* | (2006.01) |
| *F02P 11/02* | (2006.01) |
| *F02P 9/00* | (2006.01) |
| *F02P 17/12* | (2006.01) |
| *F02P 3/045* | (2006.01) |
| *F02P 5/15* | (2006.01) |

(52) U.S. Cl.
CPC ............ *F02P 11/02* (2013.01); *F02P 3/045* (2013.01); *F02P 5/1516* (2013.01); *F02P 9/002* (2013.01); *F02P 9/007* (2013.01); *F02P 17/12* (2013.01); *F02P 2017/123* (2013.01); *Y02T 10/46* (2013.01)

(58) Field of Classification Search
CPC .. F02P 11/02; F02P 9/007; F02P 9/002; F02P 3/045; F02P 3/055; F02P 5/1516; F02P 17/12; F02P 2017/123; Y02T 10/46
USPC ................. 123/605, 618, 620, 621, 630
See application file for complete search history.

(56) References Cited

U.S. PATENT DOCUMENTS

| | | | |
|---|---|---|---|
| 4,043,302 A | 8/1977 | Sessions | |
| 4,228,778 A | 10/1980 | Rabus et al. | |
| 5,097,815 A * | 3/1992 | Oota | F02P 3/0435 123/606 |
| 5,140,970 A * | 8/1992 | Akaki | F02P 3/053 123/620 |
| 5,193,515 A * | 3/1993 | Oota | F02P 3/0892 123/604 |
| 5,197,449 A * | 3/1993 | Okamoto | F02P 3/0435 123/622 |
| 5,886,476 A | 3/1999 | Skinner et al. | |

(Continued)

FOREIGN PATENT DOCUMENTS

EP 1 299 640 4/2003

*Primary Examiner* — Hai Huynh
(74) *Attorney, Agent, or Firm* — Foley & Lardner LLP

(57) ABSTRACT

A method of responding to a detected blowout in a coil ignition system is provided in this disclosure. The method includes receiving a characteristic regarding operation of a coil ignition system; determining a blowout condition exists for the coil ignition system based on the characteristic; and providing a command to the coil ignition system based on the determination that the blowout condition exists, wherein the command is structured to reduce a residual charge amount in the coil ignition system.

19 Claims, 15 Drawing Sheets

(56) References Cited

U.S. PATENT DOCUMENTS

| | | |
|---|---|---|
| 5,947,093 A | 9/1999 | Ward |
| 6,213,108 B1 | 4/2001 | Boyer et al. |
| 6,539,930 B2 | 4/2003 | Inagaki |
| 6,557,537 B2 | 5/2003 | Ikeda et al. |
| 6,701,904 B2 | 3/2004 | Lepley |
| 8,078,384 B2 | 12/2011 | Glugla et al. |
| 8,286,617 B2 | 10/2012 | Grady |
| 8,430,084 B2 | 4/2013 | Puettmann et al. |
| 8,813,732 B2 * | 8/2014 | Kataoka ................. F02P 3/051 123/621 |
| 9,531,165 B2 * | 12/2016 | Ruan ....................... F02P 3/053 |
| 9,605,644 B2 * | 3/2017 | Huberts ................. F02P 9/002 |
| 2009/0126710 A1 | 5/2009 | Alger et al. |
| 2012/0186569 A1 * | 7/2012 | Shimakawa ............ F02P 15/10 123/644 |

* cited by examiner

DUAL COIL IGNITION SYSTEM

CROSS-REFERENCE TO RELATED APPLICATIONS

This application is a continuation of U.S. patent application Ser. No. 14/558,261, entitled "DUAL COIL IGNITION SYSTEM," filed Dec. 2, 2014, which claims the benefit of U.S. Provisional Patent Application No. 61/911,962 entitled, "DUAL COIL IGNITION SYSTEM," filed Dec. 4, 2013, both of which are incorporated herein by reference in their entireties.

TECHNICAL FIELD

The present application relates to ignition systems for internal combustion engines. More particularly, the present application relates to a dual coil ignition system for a spark-ignition internal combustion engine.

BACKGROUND

Many internal combustion engine systems incorporate exhaust gas recirculation ("EGR") systems. Functionally, the EGR system redirects a portion of exhaust gas back to the cylinders of the internal combustion engine for combustion. However, exhaust gas is inert and therefore does not partake in the combustion process in the engine. Accordingly, the recycled exhaust gas has many other effects on the internal combustion engine.

Primarily, in a gasoline spark-ignition engine, the addition of exhaust gas tends to lower combustion temperatures. Lower combustion temperatures decrease the production of nitrogen ("NOx") and carbon ("COx") oxides. Accordingly, emission characteristics for a gasoline internal combustion engine tend to improve with EGR systems. Moreover, because of the lower combustion temperatures, the likelihood of the internal combustion engine "knocking" decreases (i.e., premature combustion within the cylinder). However, there are limits to the amount of EGR that can be added to the engine.

Because EGR displaces oxygen otherwise used for combustion, there can be an increase in particulate matter produced (e.g., non-combusted fuel particles). Similarly, there typically is a reduction in output power from the engine in EGR systems because of the reduction in combustible matter. Moreover, due to the decrease in oxygen, ignition can be very difficult. As such, one strategy has been to retard ignition timing to provide more time for combustion to occur prior to the exhaust stroke.

Another strategy has been the utilization of a dual coil ignition system. In a dual coil ignition system, the ignitor (e.g., a spark plug) is coupled to two sets of primary and secondary windings that are able to provide the spark plug with an extended duration of spark current. Accordingly, a longer spark (i.e., ignition event) can be used to combust difficult combustion mixtures (e.g., having too much EGR in the cylinder).

SUMMARY

The present disclosure relates to systems and methods of controlling, diagnosing, and operating a coil ignition system for an engine. One embodiment relates to an apparatus that includes a blowout module and a residual charge module. The blowout module is structured to receive a characteristic regarding operation of a coil ignition system and determine a blowout condition exists for the coil ignition system based on the characteristic. The residual charge module is structured to provide a command to the coil ignition system based on the determination that the blowout condition exists, wherein the command is structured to reduce a residual charge amount in the coil ignition system.

Another embodiment relates to a system. The system includes a controller for a coil ignition system that is operatively coupled to a spark ignition engine. The controller is communicably coupled to the coil ignition system and is structured to: receive a characteristic regarding operation of the coil ignition system; determine a blowout condition exists for the coil ignition system based on the characteristic; and provide a command to the coil ignition system based on the determination that the blowout condition exists, wherein the command is structured to reduce a residual charge amount in the coil ignition system. By managing the residual charge accumulation in the coil ignition system, the controller reduces a likelihood of a breakdown event at an undesirable time (e.g., during an intake stroke of the engine). In turn, the controller is structured to reduce one or more failure conditions for the coil ignition and engine system in order to prolong the life of the system.

Still another embodiment relates to a system. The system includes a coil ignition system that includes a first set of primary and secondary coils; a second set of primary and secondary coils; a first high voltage diode electrically coupled to the first set of coils; a second high voltage diode electrically coupled to the second set of coils; and an ignitor electrically coupled to the first and second diodes. The system also includes a controller communicably coupled to the coil ignition system, the controller is structured to: receive a characteristic regarding operation of the coil ignition system; determine a blowout condition exists for the coil ignition system based on the characteristic; and provide a command to the coil ignition system based on the determination that the blowout condition exists, wherein the command is structured to reduce an amount of residual charge in the coil ignition system.

Yet another embodiment relates to a method. The method includes receiving a characteristic regarding operation of a coil ignition system; determining a blowout condition exists for the coil ignition system based on the characteristic; and providing a command to the coil ignition system based on the determination that the blowout condition exists, wherein the command is structured to reduce a residual charge amount in the coil ignition system. In one configuration, the method also includes alternating a leading coil for the coil ignition system each engine cycle for an engine coupled to the coil ignition system; receiving a charging current threshold for the leading coil; receiving a time duration for reaching the charging current threshold for the first set of coils when the first set of coils is the leading coil and a time duration for the second set of coils when the second set of coils is the leading coil; and determining an operational status of the first set of coils and the second set of coils based on the time duration for each set of coils relative to an operational threshold time duration. In addition to reducing dielectric stress by alternating the leading coil each engine cycle, a controller or other diagnostic device may use only one charging current threshold to diagnose both sets of coils. This simplifies the diagnostic process for the coil ignition system, which may promote efficient maintenance and service of the system (e.g., a time reduction for a service technician troubleshooting the coil ignition system).

A further embodiment relates to a method of responding to a detected blowout in a coil ignition system comprising:

setting a secondary current threshold; measuring a secondary current; determining if the secondary current has dropped below the threshold; and providing a response signal to the coil ignition system if the secondary current has dropped below the threshold.

Still a further embodiment relates to a coil ignition system comprising a first set of primary and secondary coils, a second set of primary and secondary coils, a first high voltage diode electrically coupled to the first set of coils, a second high voltage diode electrically coupled to the second set of coils, an ignitor electrically coupled to the first and second diodes, a first resistor in parallel with the first diode, and a second resistor in parallel with the second diode. The first and second resistors are also electrically coupled to the ignitor.

Still a further embodiment relates to a coil ignition system comprising a first set of primary and secondary coils; a second set of primary and secondary coils; a first high voltage diode electrically coupled to the first set of coils; a second high voltage diode electrically coupled to the second set of coils; an ignitor electrically coupled to the first and second diodes; a circuit electrically coupled to a ground, the ignitor and the first and second diodes; a relay electrically coupled to the circuit; and a coil control signal generation device electrically coupled to the relay. The device is configured to selectively actuate the relay to the close the circuit to provide a flowpath for a residual charge trapped between the high voltage diodes and the ignitor to the ground. In one embodiment, the circuit is external of the coil ignition system.

Yet a further embodiment relates to a coil ignition system comprising a first set of primary and secondary coils; a second set of primary and secondary coils; a first high voltage diode electrically coupled to the first set of coils; a second high voltage diode electrically coupled to the second set of coils; an ignitor electrically coupled to the first and second diodes; a circuit electrically coupled to a ground, the ignitor, and the first and second diodes; a relay electrically coupled to the circuit; and a coil control signal generation device electrically coupled to the relay. The device is configured to selectively actuate the relay to the close the circuit to provide a flowpath for a residual charge trapped between the high voltage diodes and the ignitor to the ground. According to one embodiment, the circuit is located within (e.g., internal) of the coil ignition system.

Another embodiment relates to a method for detecting a non-operational ignition coil in a coil ignition system comprising receiving an engine and a coil ignition system diagnostic, determining a spark duration based on the diagnostic, determining the spark timing based on the diagnostic, providing a control signal to the coil ignition system configured to substantially meet the determined spark timing and duration determinations, setting a charging current threshold, and measuring the time it takes to reach the threshold for each engine cycle. According to one embodiment, if the charging duration for either the first set of coils or the second set of coils in the coil ignition system is greater than the charging current threshold, a determination is made that the set of coils corresponding to the charging duration greater that the charging current threshold is non-operational.

These and other features, together with the organization and manner of operation thereof, will become apparent from the following detailed description when taken in conjunction with the accompanying drawings.

DETAILED DESCRIPTION OF VARIOUS EMBODIMENTS

Figure 1:
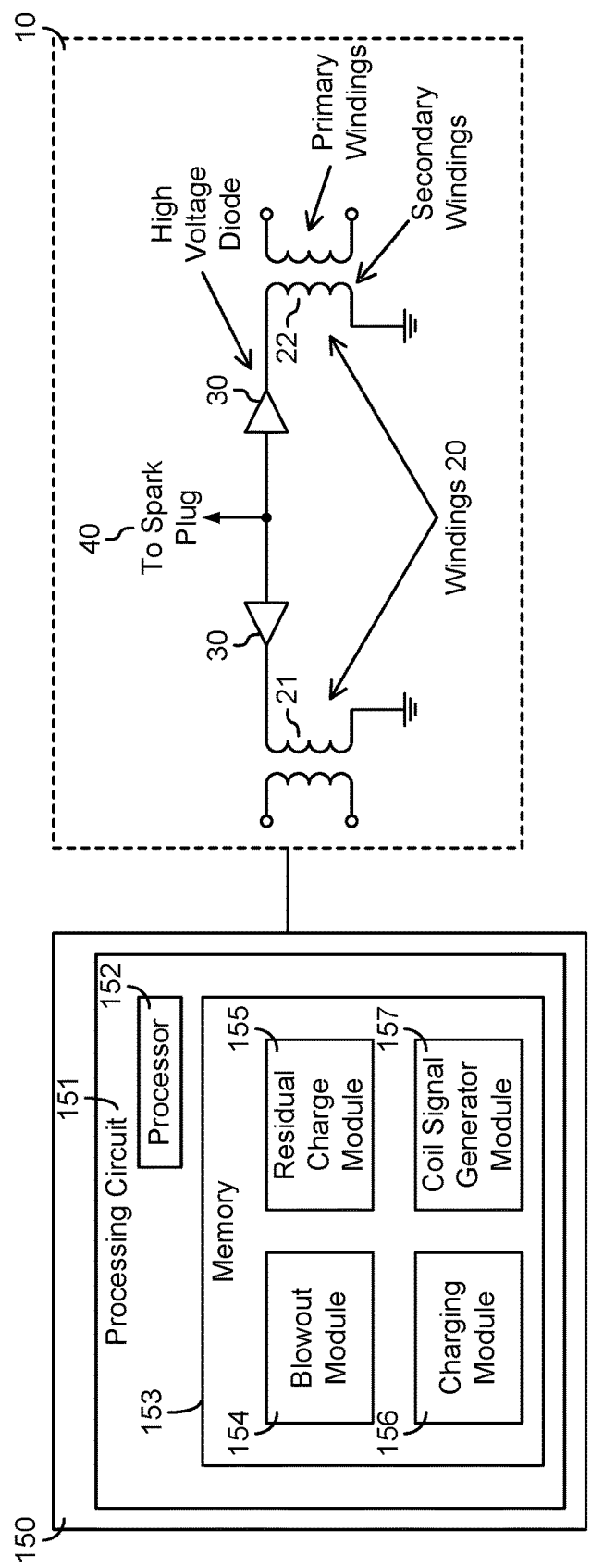
FIG. 1 is a circuit diagram for a dual coil ignition system, according to an exemplary embodiment.

Referring to the Figures generally, the various embodiments disclosed herein relate to control and diagnostic systems and methods for dual coil ignition systems. While the present disclosure is primarily directed to "dual-coil" ignition systems, the systems and methods described herein may be applicable to a variety of different coil ignition systems (e.g., a three coil ignition system, each coil comprising a primary and secondary winding, etc.). Generally, however, the present disclosure applies to dual coil ignition systems implemented with spark-ignition engines of any fuel type (e.g., gasoline, etc.).

Dual coil ignition systems employ two coils, each comprising a primary and a secondary winding, per spark plug or ignitor. In the dual coil configuration, there are two high voltage diodes that allow current to flow from each coil to the ignitor. While the diodes prevent current from flowing into the opposite coils, they also introduce an unintended consequence—a trapped or residual charge between the diodes and the ignitor. This trapped charge may cause undesirable consequences. For example, the trapped charge may accumulate during successive coil discharges and breakdown during unwanted times, such as during the intake stroke of a spark ignition engine. Accordingly, premature sparks can occur that may cause damage to the engine due to unwanted combustion. According to the present disclosure, various systems and methods are disclosed for ameliorating this trapped charge in a dual coil ignition system.

As described more fully herein, according to various exemplary embodiments, systems and methods of releasing the trapped charge may include eliminating transient voltage (i.e., restriking), introducing a small "trapped charge clearing" discharge (e.g., an additional or specifically commanded firing of the ignitor), and increasing the dwell time of the restrike as soon as a blowout (described more fully herein) has been detected to create a controlled breakdown. Other exemplary embodiments may include providing flowpaths for the trapped charge, such as by providing a diode with a controlled leakage to create a pathway for discharging or dissipating the trapped charge. These methods can be utilized alone or in combination with other processes or methods to clear or substantially clear the trapped charge.

In addition to the accumulation of trapped charge, during operation of a dual coil ignition system, a relatively greater dielectric stress is typically experienced on the leading ignition coil than in the trailing coil in the system. During operation, the coils maintain a near continuous spark by alternating the two coils' charging and discharging processes, such that one coil is charging while the other coil is discharging. Typically, this corresponds to an "A-B-A-B . . . " sequence, where A is the leading coil and B is the trailing coil. According to the present disclosure, the sequence is reversed for each engine cycle. For example, the first engine cycle may be "A-B-A-B," the second engine cycle is "B-A-B-A," the third engine cycle is "A-B-A-B," and so on. By alternating which coil leads, the dielectric stress is spread out relatively more evenly between the two coils. Further, as described more fully herein, the alternating sequence may also provide for an improved detection and diagnosis of a non-operational ignition coil in the coil ignition system. These and other features of the present disclosure are described more fully herein.

Referring now to FIG. 1, a dual coil ignition system 10 is shown according to an exemplary embodiment. The dual coil ignition system 10 includes two high voltage diodes 30, two sets of primary and secondary windings 20, and a controller 150. While only the primary and secondary sets of windings are highlighted in the second set of windings 22, it should be understood that the primary set of windings 21 includes a similar structure as that of the secondary set of windings 22. The controller 150 is communicably coupled to the dual coil ignition system 10 and, among other functions, provides one or more control signals (e.g., commands) to the dual coil ignition system 10 to control the charging/discharging process of the coils (e.g., to affect a specific spark duration and spark timing, etc.). The controller 150 may be included with any controller implemented in an ignition system. For example, the controller 150 may include an electronic control module ("ECM"), such as an engine control module, a powertrain control module, an aftertreatment control module, a transmission control module, a separate controller (e.g., distinct from other vehicle controllers), and the like. The structure and additional functionality of the controller 150 is described below.

During conventional operation, the dual coil ignition system 10 is coupled to a power source (e.g., a battery, etc.). The power source provides electrical current to the primary winding, which induces a high voltage "charge" in the secondary winding. The induced high voltage charge is delivered to the ignitor 40 to cause the spark. In operation, a first set of coils 21 discharges to provide the "spark" to the ignitor 40. As the first set of coils 21 is discharging, the second set of coils 22 is charging. Because both coil sets are electrically coupled to the ignitor 40, prior to the spark extinguishing, the second set of coils 22 provides the charge necessary for a continuous spark from the ignitor 40. In a vehicle embodiment, each cylinder includes its own dual coil ignition system 10 electrically coupled to an ignitor (e.g., spark plug or sparking unit) for that cylinder. For purposes of providing an example, in the disclosed embodiments, the ignitor is assumed to be a spark plug. As will be appreciated, however, other types of ignitors may also be used to, e.g., initiate combustion in a cylinder of an engine. As an undesirable consequence of operation of the system 10, when the secondary windings are discharging—at some point in time after the power source has disconnected from the system 10—the discharge voltage becomes insufficient to traverse the spark gap in an ignitor, which results in a "trapped charge" between the diodes and the ignitor 40. This trapped charge (also referred to herein as a residual charge) may cause unwanted consequences, such as a breakdown situation, at undesirable times during operation of the system 10. According to the present disclosure, various systems and methods for detecting and managing the trapped charge are disclosed herein.

Figure 2:
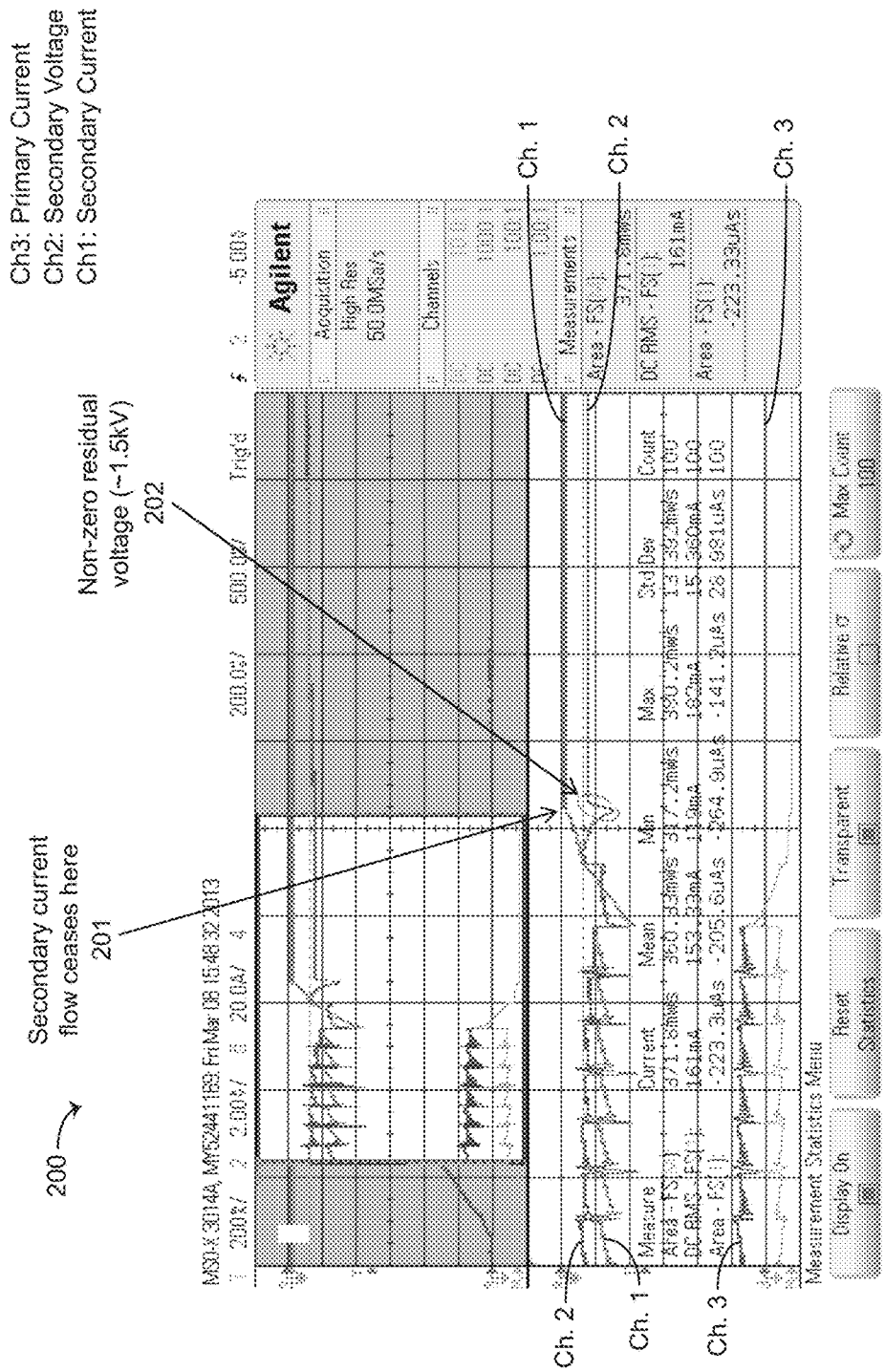
FIG. 2 is a graph depicting a residual charge for a dual coil ignition system, according to an exemplary embodiment.

Referring now to FIG. 2, a residual charge illustration is shown according to an exemplary embodiment. FIG. 2 depicts operating conditions for a dual coil ignition system that result in a generation of a trapped charged, according to one embodiment. In typical situations, a battery or power source voltage is boosted (i.e., transformed greater) as a supply to the ignition coil(s), which in turn creates the voltage necessary to provide a spark from the ignitor. In operation, a trapped charge situation tends to occur whenever the secondary current ceases to flow (e.g., goes to zero amperes) prior to the coils being fully discharged. In graph 200, the secondary current has ceased flow at 201. The secondary current refers to the current from the set of secondary coils or windings. The secondary current is the current provided to the ignitor and is responsible for the spark. If the secondary current ceases to flow, a small voltage on the ignitor remains, corresponding to the residual energy in the coil. This small voltage is generally insufficient for immediately re-initiating a spark (e.g., the lower energy charge is insufficient to traverse the spark gap and cause a spark from the ignitor). Accordingly, this charge becomes trapped between the high voltage diode and the ignitor. In the example in FIG. 2, it can be seen that when the secondary current has ceased (201), a non-zero residual voltage of approximately 1.5 kilovolt ("kV") remains (202). The example depicted in FIG. 2 is a dual coil ignition system coupled to a 12 volt ("V") power source. While FIG. 2 illustrates one example system configuration, other battery voltages would yield similar results.

Figure 3:
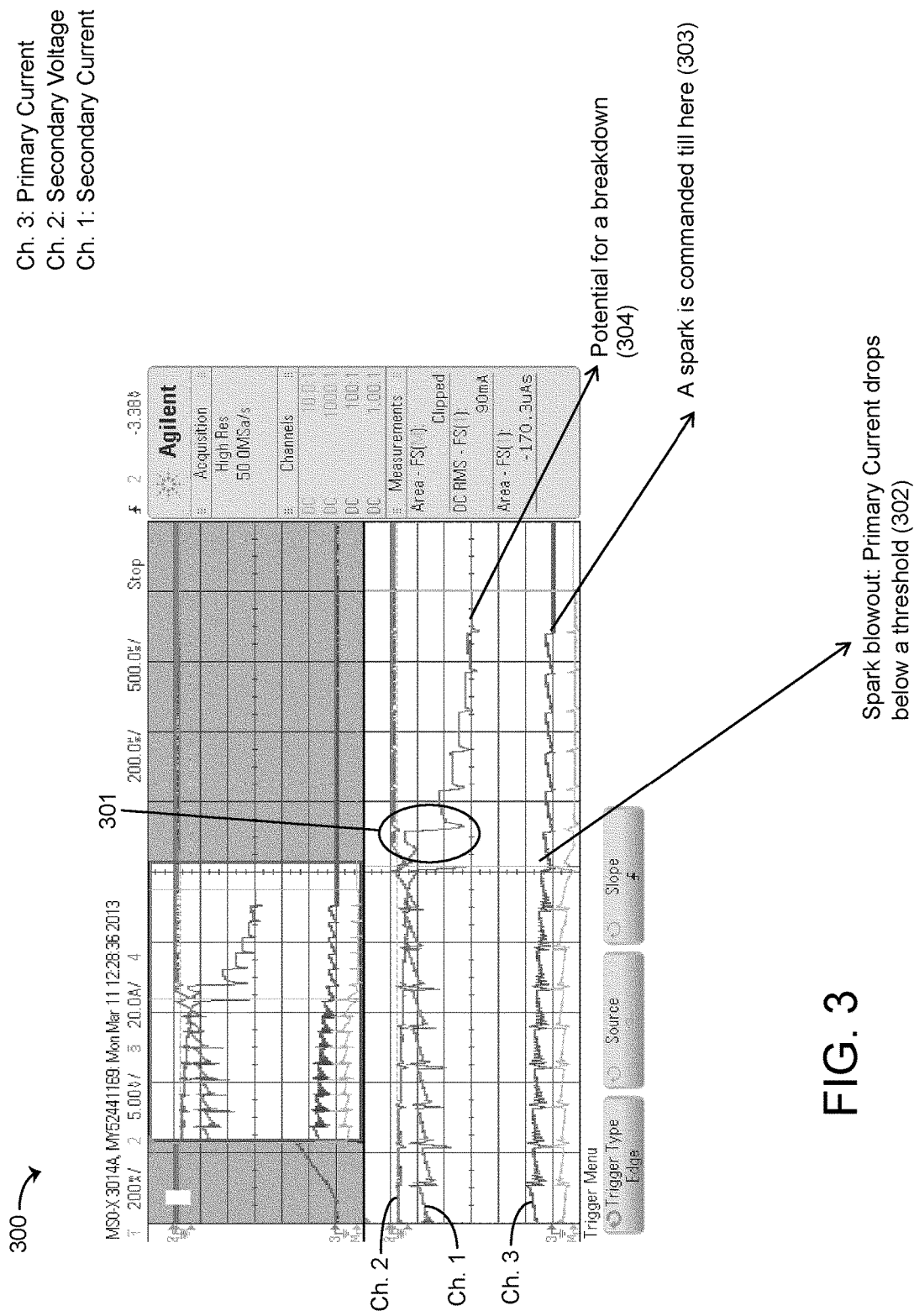
FIG. 3 is a graph of a blowout condition for a dual coil ignition system, according to an exemplary embodiment.

Referring to FIG. 3, a residual charge "blowout" case is illustrated according to an exemplary embodiment. A "blowout" refers to a situation in which the spark has become prematurely extinguished, yet the ignition system is unaware of the extinguishment. One situation that may lead to blowout is during high or varying engine loads (i.e., turbulent engine operating conditions). During these turbulent engine conditions, the likelihood of the spark extinguishing can increase because of the strains on the engine and electrical system. These strains may cause turbulence in the spark gap that extinguish the spark. However, the coils continue to discharge as if to sustain the spark, but such discharges are insufficient to re-initiate the spark (see, e.g., 303 in graph 300). Graph 300 depicts a blowout situation of the residual charge in FIG. 2. Due to successive discharges that do not cause a spark from the ignitor, a build-up of trapped charge may occur that can eventually lead to a breakdown event (304). A breakdown refers to the accumulated residual charge overcoming the resistance in the path between diodes and ignitor to cause or attempt to cause a spark from the ignitor. A breakdown may be undesirable due to its timing. For example, a breakdown can occur during the intake stroke, which increases the possibility of a premature combustion and potential damage to the engine. While uncontrolled breakdown events may be undesirable, as described herein below, controlled breakdown events may be desirable in order to clear the accumulated residual charge.

Still referring to FIG. 3, graph 300 illustrates a configuration with a negative polarity ignitor. Accordingly, an increase in voltage and current corresponds to a downward trending line (i.e., a more negative value) due to the negative polarity. As shown in FIG. 3, in regard to a determined blowout situation, there is a decrease in secondary current (channel 1 depicted as "Ch1") and an increase in secondary voltage (channel 2). As shown at 301, the secondary current has gone to zero and the secondary voltage has increased (i.e., become more negative). Additionally, the primary current (channel 3) (current from the primary windings) has decreased (302). According to one embodiment, the threshold value that indicates a blowout condition is zero amperes of secondary current flow. However, in some embodiments, there may be electrical noise in the measurements, such that the threshold value is offset from zero to account for such noise (e.g., plus-or-minus 20 milliamps). Although the primary and secondary current has dropped, the dual coil ignition system is still commanding and expecting a spark until point 303. But, the coils have not been fully discharged. Accordingly, as shown by the secondary voltage chart line (point 304 and channel 2), with each successive discharge while the secondary current has ceased, an additional accumulation of trapped charge occurs. This is shown by the ripples becoming progressively more negative (corresponding to an increase of charge due to the negative polarity) over time. Because breakdown has not occurred, the successive discharges act to accumulate a trapped charge while the secondary current is ceased.

As shown in FIG. 3, several characteristics represent the potential for blowout or a blowout condition existing. These characteristics may be used by the controller 150 to determine that a blowout situation or a potential for blowout situation exists (as used herein, the terms condition and situation are used interchangeably when referring to detecting and/or determining that or whether a blowout exists). As shown, the potential for blowout may be determined via: a primary current measurement or determination relative to a threshold value indicative of a blowout situation (e.g., zero amperes or approximately zero amperes to account for noise in the data amperes, etc.), a secondary current measurement (or determination based on data) below a threshold value (point 303), and/or by a direct secondary voltage measurement (point 302). For example, the controller 150 may include a predefined threshold value for residual charge based on a direct secondary voltage measurement (or, data indicating an approximate value of residual charge accumulation). If the secondary voltage measurement is at or above the threshold, the controller 150 may provide one or more commands (described below) to manage the residual charge accumulation. The controller 150 may continuously (or, periodically) measure (or receive data regarding) the primary current, secondary current, and secondary voltage to determine if a blowout situation exists. Measuring or determination may be done via one or more sensors, such as a sense resistor, ammeter, a variable resistor, etc. In this case, the controller 150 may receive data from one or more sensors indicating the aforementioned measurements. In other alternate embodiments, the controller 150 may use one or more algorithms, formulas, processes, look-up tables, and the like to determine or estimate values of the primary current, secondary current, and/or secondary voltage at various operating conditions (e.g., during a rolling hill excursion where there are transient loads). The controller 150 may use the determined or estimated values of primary current, secondary current, and/or secondary voltage (e.g., relative to one or more thresholds) to determine if a blowout situation exists. If a blowout situation or a potential for a blowout situation has been determined, as described herein, the controller 150 may command various actions to prevent an unintended breakdown by managing the residual charge accumulation.

Accordingly, the controller 150 is structured to control operation of the coil ignition system 10 to manage the residual charge accumulation. To do so, the controller 150 may receive characteristic data regarding operation of the coil ignition system to base one or more commands on the operational characteristics of the coil ignition system. According to one embodiment, the components of FIG. 1 are embodied in a vehicle. The vehicle may include an on-road or an off-road vehicle including, but not limited to, line-haul trucks, mid-range trucks (e.g., pick-up trucks), tanks, airplanes, and any other type of vehicle that utilizes an exhaust aftertreatment system. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 150 is communicably coupled to the systems and components of FIG. 1, the controller 150 is structured to receive data from one or more of the components shown in FIG. 1. For example, as mentioned above, the data may include a secondary current flow, a primary current flow, a secondary voltage, a primary voltage for the set of coils, and/or a spark timing and a spark duration for the ignitor. In some embodiments, the controller 150 may be coupled to an engine coupled to the coil ignition system, such that the controller 150 may receive data regarding operation of the engine (e.g., an engine speed, an engine torque, an EGR amount for the engine, etc.).

As shown, the controller 150 includes a processing circuit 151 including a processor 152 and a memory 153. The processor 152 may be implemented as a general-purpose processor, an application specific integrated circuit ("ASIC"), one or more field programmable gate arrays ("FPGAs"), a digital signal processor ("DSP"), a group of processing components, or other suitable electronic processing components. The one or more memory devices 153 (e.g., RAM, ROM, Flash Memory, hard disk storage, etc.) may store data and/or computer code for facilitating the various processes described herein. Thus, the one or more memory devices 153 may be communicably connected to the processor 152 and provide computer code or instructions to the processor 152 for executing the processes described in regard to the controller 150 herein. Moreover, the one or more memory devices 153 may be or include tangible, non-transient volatile memory or non-volatile memory. Accordingly, the one or more memory devices 153 may include database components, object code components, script components, or any other type of information structure for supporting the various activities and information structures described herein.

The memory 153 is shown to include various modules for completing the activities described herein. While various modules with particular functionality are shown in FIG. 1, it should be understood that the controller 150 and memory 153 may include any number of modules for completing the functions described herein. For example, the activities of multiple modules may be combined as a single module, additional modules with additional functionality may be included, etc. Further, it should be understood that the controller 150 may further control other vehicle activity beyond the scope of the present disclosure.

As shown, the controller 150 includes a blowout module 154, a residual charge module 155, a charging module 156, and a coil signal generator module 157. The blowout module 154 is structured to receive a characteristic (e.g., data) regarding operation of the coil ignition system and determine that a blowout condition or situation for the coil ignition system exists based on the characteristic. For example, in one embodiment, the blowout module 154 receives a secondary current level for the coil ignition system. Based on a flow rate of the secondary current being at or below a threshold value (e.g., zero amperes), the blowout module 154 determines that a blowout condition exists. In other example configurations, the blowout module 154 receives other characteristics that are indicative of a blowout condition (e.g., a secondary voltage at or above a threshold value, a primary current level at or below a threshold value (e.g., zero amperes), etc.) and determines that a blowout situation exists based on that data.

Based on a determination that a blowout situation exists, the residual charge module 155 is structured to provide one or more commands to reduce an amount of residual charge in the coil ignition system. According to one embodiment, the residual charge module 155 provides a command to an ignitor to cause the ignitor to fire (e.g., generate a spark). The effect of this additional spark is shown and described herein in regard to FIG. 7 (e.g., the additional spark substantially clears/removes the trapped charge in the system by causing the trapped charge to be used to generate a spark). According to another embodiment, the residual charge module 155 provides a command to stop restriking in the coil ignition system. This effect is shown and described herein in regard to FIG. 5. According to a further embodiment, the residual charge module 155 is structured to provide a command to control the charge time of the coils in the coil ignition system. For example, the residual charge module 155 is structured to increase the dwell time of the primary coil (e.g., the time it takes to reach a predetermined charging level for the coil). According to one embodiment, the dwell time is increased approximately four times relative to a time duration that corresponded with a charge time of the primary coil prior to a blowout being detected (see FIG. 6 where time 602 is approximately four times longer in duration than time 608). As shown and described further in regard to FIG. 6, increasing the dwell time increases a secondary voltage and, therefore, the residual charge amount in order to cause a controlled breakdown event, which may lead to a subsequent firing (e.g., spark) from the ignitor. However, by controlling when the dwell time is increased, the subsequent spark may be commanded at a time that is less likely to cause any damage to the engine or ignition system (e.g., during the exhaust stroke as compared to during the intake stroke). These functions and structure of the controller 150 may independently or collectively work to reduce the amount of trapped charge in the coil ignition system.

According to one embodiment, the controller 150 is also structured to reduce dielectric stress in the coil ignition system. The controller 150 may use the charging module 155 and the coil signal generator module 157 to reduce the dielectric stress in the coils of the coil ignition system. The coil signal generator 157 is structured to provide a command to control when and which coils charge/discharge in the coil ignition system. The coil signal generator module 157 is structured to alternate a leading coil for the coil ignition system each engine cycle. Engine cycle refers to the combustion timing for the cylinder in an engine. For example, a six-cylinder engine, may have a first engine cycle of 1-3-4-2-5-6 and a second engine cycle of 3-1-2-6-5-4 (the numbers refer to the cylinder (e.g., cylinder 1, cylinder 3, etc.) that experiences a combustible event). For cylinder 1, for a dual coil ignition system comprising two coils (each having a primary and secondary set of coils), A and B, in the first engine cycle, the module 157 commands the sequence to be A-B-A-B and so on for the determined duration of the spark. In the second engine cycle (e.g., when cylinder 1 is commanded to fire again), the module 157 commands the sequence to B-A-B-A and so on for the determined duration of the spark. Thus, the leading coil in the first engine cycle for cylinder 1 is the A coil and the leading coil in the second engine cycle is the B coil. This sequence may continue during operation of the vehicle and engine. By alternating the leading coil on each engine cycle, the amount of dielectric stress is spread relatively evenly between the coils. This may prolong life of the coil ignition system and reduce the need for maintenance and service on the coil ignition system.

The charging module 155 is structured to receive a charging current threshold for the leading coil (i.e., the charge level (e.g., voltage and/or current) of a coil suitable for discharge (i.e., to cause a spark from the ignitor)). Accordingly, the phrase charging current threshold is meant to include at least one of a voltage and current suitable for causing a spark from an ignitor. As such, different coil ignition systems with different ignitor configurations may have different charging current thresholds in order to generate a spark from the ignitor. The charging current threshold may be preprogrammed in the controller 150. In some embodiments, a technician may specify the charging current threshold if a diagnostic procedure is being performed. The charging current module 155 is structured to receive a time duration for reaching the charging current threshold for the leading coil (when alternating, each coil may lead and, consequently, have its own time duration). The time duration corresponds to the time it takes for the coil to be charged to the charging current threshold. The charging module 155 is then structured to determine an operational status of the first set of coils and the second set of coils based on the time duration relative to an operational threshold time duration. According to one embodiment, the charging module 155 determines that either the first or second set of coils is non-operational based on if the time it takes for the coil to reach the charging current threshold is greater than or equal to the operational threshold time duration. For example, the operational time threshold may correspond to five seconds. If the time duration for coil A is seven seconds and the time duration for coil B is three seconds, the charging module 155 determines that coil A is non-operational and coil B is operational. While the terms operational and non-operational are generally used herein, these terms are used to indicate that the coil is not operating as designed. In some embodiments, an operator of the vehicle where the coil ignition system is embodied may be alerted to a non-operational coil via a check engine light. In other embodiments, a technician servicing the coil ignition system may receive a notification to examine the non-operational coil further. All such variations are intended to fall within the spirit and scope of the present disclosure.

As described above, the controller 150 is structured to manage a residual charge in the coil ignition system, control the charge/discharge sequence for the coils, and diagnose the coils in the coil ignition system. These functions are described more fully herein in regard to the FIGS. 3-12.

Figure 4A:
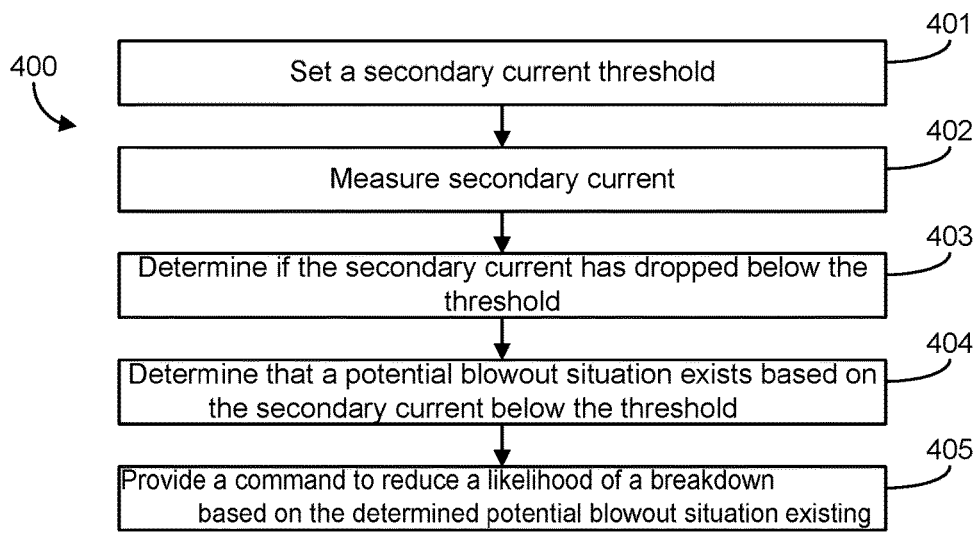
FIG. 4A is a graphical representation of a method of responding to a blowout condition in a dual coil ignition system, according to an exemplary embodiment.
Figure 4B:
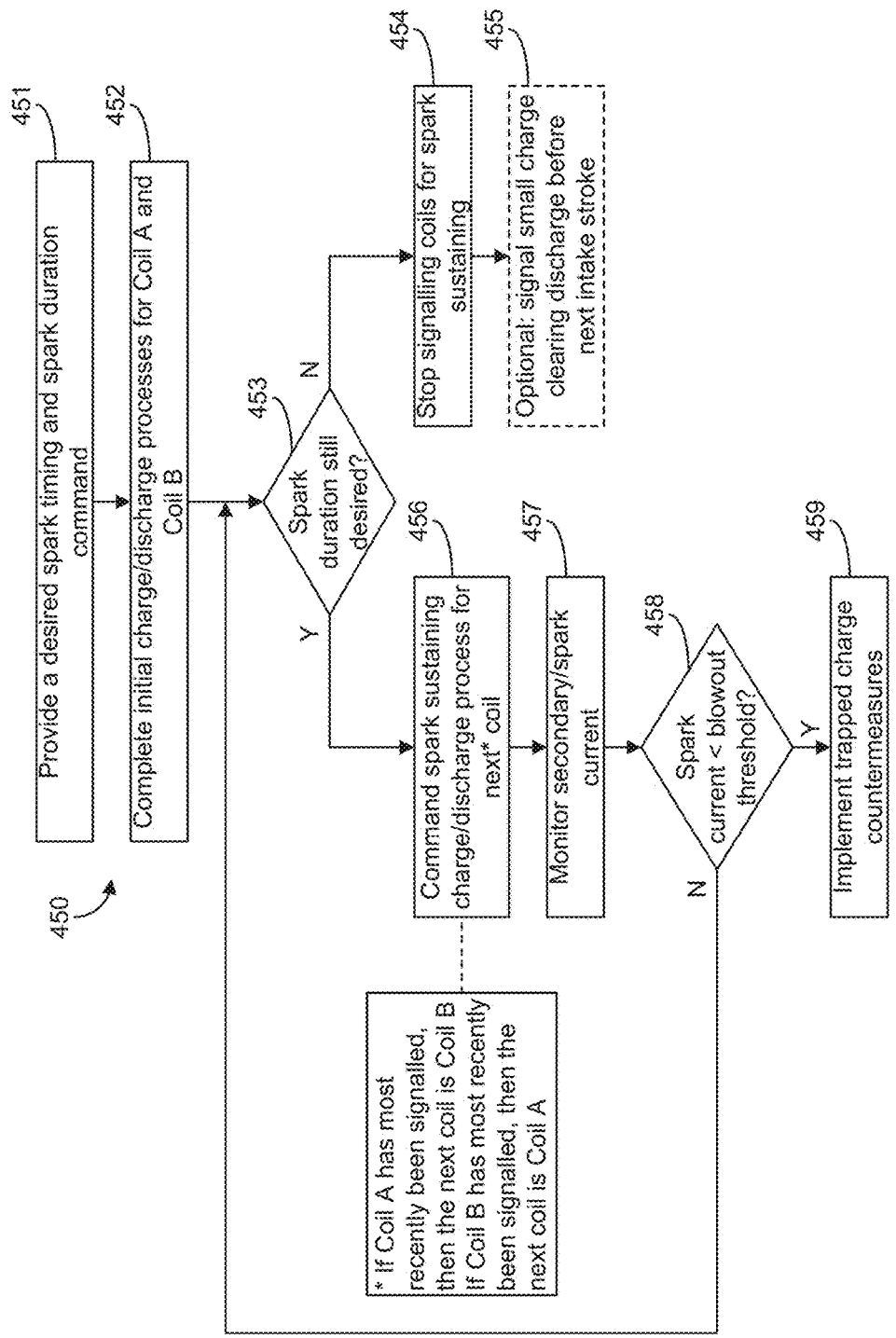
FIG. 4B is a graphical representation of another method of responding to a blowout condition in a dual coil ignition system, according to an exemplary embodiment.

Referring now to FIGS. 4A-4B, methods of ameliorating a trapped charge in a dual coil ignition system are shown, according to various embodiments. According to one embodiment, methods 400 and 450 may be implemented with the controller of FIG. 1. As such, various processes of methods 400 and 450 may described in regard to the controller 150.

Referring to FIG. 4A, a graphical representation of a method 400 of responding to a detected blowout in a dual coil ignition system is shown, according to one embodiment. Method 400 may begin with a secondary current threshold being set (401). A measurement of secondary current is taken (402). In other embodiments, the secondary current may be estimated, determined, and/or otherwise indicated (e.g., using one or more formulas, algorithms, look-up tables, etc.). A determination is made whether the secondary current has dropped below the threshold value (403). If the secondary current has dropped below the threshold value, a determination is made that a blowout or potential blowout situation may exist (404). As described herein, in one embodiment, the threshold value is zero amperes plus a predefined noise amount (e.g., plus 50 mA). In other embodiments, the determination could be at a threshold value (e.g., the current is at the threshold value of zero amperes). All variations are intended to fall within the scope of the present disclosure. In response, a command may be provided to reduce a likelihood of a breakdown event in the dual coil ignition system (405). As mentioned above, drops in primary current, secondary current, and secondary voltage can indicate a blowout situation. If a blowout situation is detected, one or more response signals can be commanded by for example, the controller 150. The controller 150 may provide a command to eliminate restriking, to introduce a small "trapped charge clearing" discharge, and/or to increase the dwell time of the restrike. These specific commands and operations are described in greater detail herein in regard to FIGS. 5-10.

Referring next to FIG. 4B, a graphical representation of another method 450 of determining and responding to a determined blowout situation or potential blowout situation in a dual coil ignition system is shown, according to another exemplary embodiment. Method 450 may begin with a desired spark timing and duration command being provided (451). The command may be determined and provided by the controller 150. In operation, the controller 150 may achieve the spark timing and duration from commands provided to one or more circuit components (e.g., diode, transformer, gate, etc.). The determination of a desired spark timing and duration may be based on operational data received in regard to operation of the engine and/or vehicle. For example, based on an amount of EGR being provided to a cylinder, the spark timing should be advanced and the duration increased. This command would provide an extended duration spark that is more likely to cause combustion in the cylinder, despite the relatively high amount of EGR (which, typically, causes difficult combustion conditions). At process 452, a determination is made that an initial charge/discharge process for Coil A and Coil B is complete (i.e., the two sets of coils in the dual coil system). A determination is made whether the desired spark duration is still desired at process 453. For example, if an increasing amount of exhaust gas is directed to the engine cylinder, then the controller 150 may determine to increase the spark duration to promote combustion. If the controller 150 determines that spark duration is no longer desired, the controller 150 may provide a signal to the coils to stop sustaining the spark (454). In other words, a power transmission circuit between the power source and the ignition system may be opened thereby stopping the charge inducement in the secondary windings to create the spark. According to one embodiment, the controller 150 provides a signal to generate a charge clearing discharge from the ignitor (before the intake stroke) to reduce the amount of trapped charge (455). For example, the controller 150 may provide a command to the ignitor to "spark," which results in the trapped charge being used to generate the spark.

In comparison, if the spark duration is still desired, the controller 150 may command a spark sustaining charge/discharge process for the next coil (456). The "next coil" is defined as the coil that has not been most recently charged/discharged. After providing the command, the controller 150 monitors the secondary (i.e., spark) current (457). For example, the controller 150 monitors the secondary current to ensure that the secondary current has not decreased to at or below the threshold value (458). If the secondary current has decreased to at or below the threshold value, the controller 150 may determine that a blowout situation or potential blowout situation exists.

Based on the determination of a blowout situation or a potential blowout situation, the controller 150 may provide one or more commands to manage the trapped charge to reduce the likelihood of a breakdown event (459). As mentioned above, these commands may include, but are not limited to, a command to eliminate restriking, a command to introduce a trapped charge clearing discharge, and/or a command to increase the dwell time of the restrike.

As mentioned above, methods 400 and 450 can be implemented using controller 150. Accordingly, methods 400 and 450 can be coded as instructions in a program to be run by one or more processors in controller 150. The program may include one or more device drivers for allowing the program to interface with one or more peripheral devices (e.g., an ECM). According to one embodiment, the instructions may be read from a computer readable format (e.g, machine-readable instructions, such as ROM or RAM). Accordingly, methods 400 and 450 are capable of several implementation configurations including a combination of hardware and machine-readable devices coupled to the dual coil ignition system.

Referring now to FIGS. 5-9, graphical illustrations of the implementation of one or more of the commands in a dual coil ignition system, are shown according to various exemplary embodiments.

Figure 5:
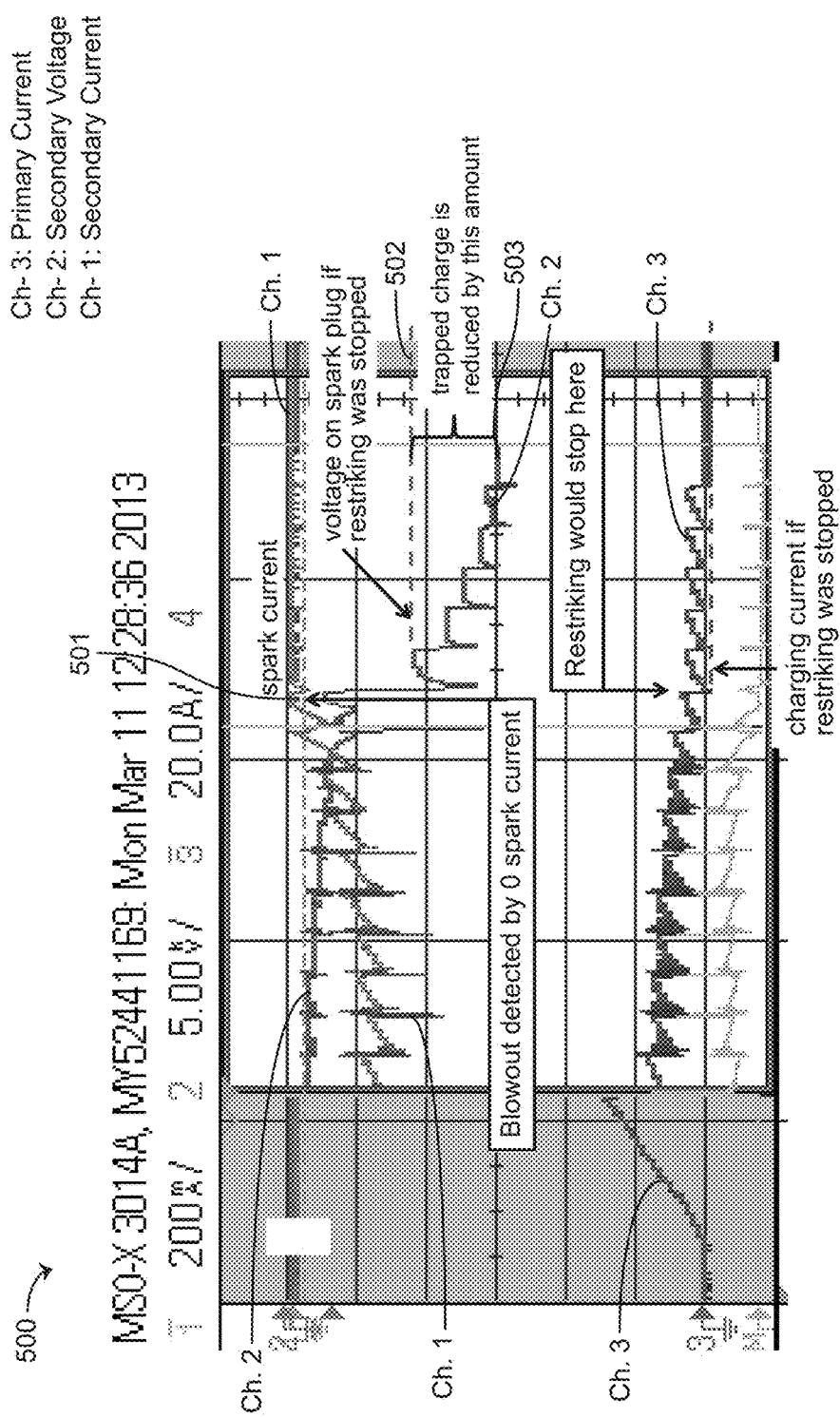
FIG. 5 is a graph depicting primary current, secondary current, and secondary voltage when restriking has been eliminated, after a blowout condition has been detected, in a dual coil ignition system, according to an exemplary embodiment.

FIG. 5 is a graphical illustration of a dual coil ignition system with restriking eliminated, according to one embodiment. Restriking is the process of continuing to command discharges from the coils for a spark. In the case of a blowout (an extinguished spark), the continuing discharges may work to increase the amount of trapped charge because the discharges are insufficient to re-initiate the spark. According to an exemplary embodiment, an ECM or the controller 150 detects a blowout via a sense resistor or other type of detector and provides a signal to the dual coil ignition system. By providing a command to stop demanding a spark (i.e., step 406 of method 400), the coil discharging ceases (even with the spark extinguished), such that the accrual of more trapped charge is prevented. In the example of FIG. 5, the controller 150 detects a blowout or potential blowout situation by receiving data indicative of the secondary current dropping to at or below a threshold (location 501 in graph 500). In this case, the threshold value is zero amperes. In other embodiments, the threshold value may be another value that provides an indication of a decreasing secondary current. Subsequent to this determination, the controller 150 provides a command to stop demanding a spark (i.e., stop restriking). As a result, the coils stop discharging. The secondary voltage stops increasing, and accumulation of trapped charge is effectively stopped (because restriking involves a relatively low secondary voltage that is insufficient to cause a spark (which, as a result, tends to then accumulate)). Both FIGS. 3 and 5 show blowout situations, with FIG. 5 showing the controller 150 commanding an elimination of restriking. By stopping restriking, the secondary voltage is at approximately level 502, whereas if restriking was allowed to continue, the secondary voltage is allowed to increase by approximately amount 503. As shown, the trapped charge accumulation in FIG. 5 is decreased by approximately 5 kV relative to FIG. 3. Accordingly, restriking functions to reduce the trapped charge accumulation in the system 10. This reduces the likelihood of a breakdown occurrence at one or more unwanted times.

Figure 6:
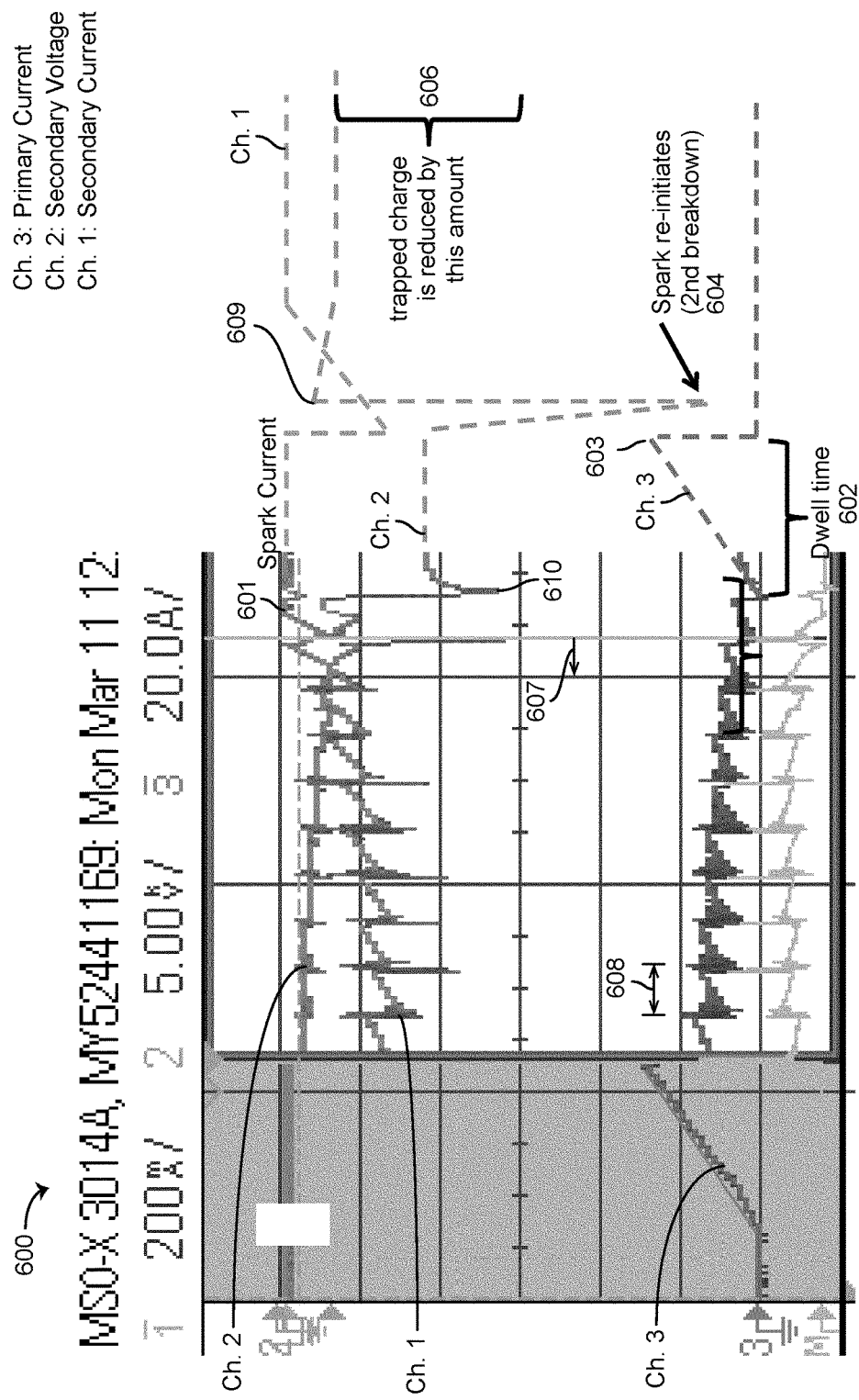
FIG. 6 is a graph depicting primary current, secondary current, and secondary voltage when dwell time for a restrike has been increased, after a blowout condition has been detected, in a dual coil ignition system, according to an exemplary embodiment.

Referring next to FIG. 6, a graph 600 of the result of increasing the dwell time of the restrike as soon as a blowout or potential blowout situation has been detected is shown, according to one embodiment. Dwell time refers to the charging time of the primary ignition coil. By increasing the dwell time, more energy is provided to the primary coil. In FIG. 6, the dwell time for the primary coil (pre-blowout detection) is indicated by time 602. Discharge of primary coil is shown to start at point 603 (post-blowout with the dwell time increased). As in FIGS. 3 and 5, the secondary spark current has dropped to a threshold value at 601 (e.g., zero amperes) and, consequently, the controller 150 has determined that a blowout situation or a potential blowout situation exists. In the area of the graph 600 (indicated by direction arrow 607) prior to the blowout situation being determined, the dwell time is indicated by a time 608 (time between charge/discharge). After blowout has been determined, the controller 150 provides a command to increase the dwell time to a time 602, which is shown to be relatively greater than time 608. As shown, time 602 is approximately four times greater than time 608. In other embodiments, time 602 may be different "times" greater than time 608. According to one embodiment, time 608 is at or approximately equivalent to a charge time sufficient to maintain a spark from the ignitor, which is less than the time required to cause (e.g., initiate) the spark from the ignitor. In this case, time 602 refers to the time to re-initiate the spark by causing a breakdown event due to the accumulation of trapped charge. In some embodiments, time 602 may be 1.5 times greater than time 608 while in others, like the example depicted in graph 600, time 602 may be four times greater than time 608. All variations are intended to fall within the spirit and scope of the present disclosure.

By increasing the primary coil current after the spark current has ceased, a relatively larger secondary voltage is induced. This is shown by the increase (i.e., more negative) in secondary voltage at 604. By increasing the secondary voltage, to cause a controlled breakdown, a spark from the ignitor occurs. After spark re-initiation at 604, the secondary voltage is at a level 609 (the term "level" refers to an amount in regard to graph 600). As shown, increasing the dwell time increased the level of secondary voltage to cause a spark, which functioned to clear out most or all of the accumulated charge. After the spark, the secondary voltage is at a level 609, which represents a reduction in charge relative to level 610 (the charge accumulation level without any trapped charge countermeasures applied) and a reduction in charge relative to 604. More particularly, level 609 represents a reduction in trapped charge by an amount 606 (relative to the trapped charge level 610). Thus, with reference to method 400, the controller 150 may provide a command to increase the dwell time in the primary coil to cause a breakdown event and, therefore, a spark re-initiation to clear or substantially the trapped charge in the system.

Figure 7:
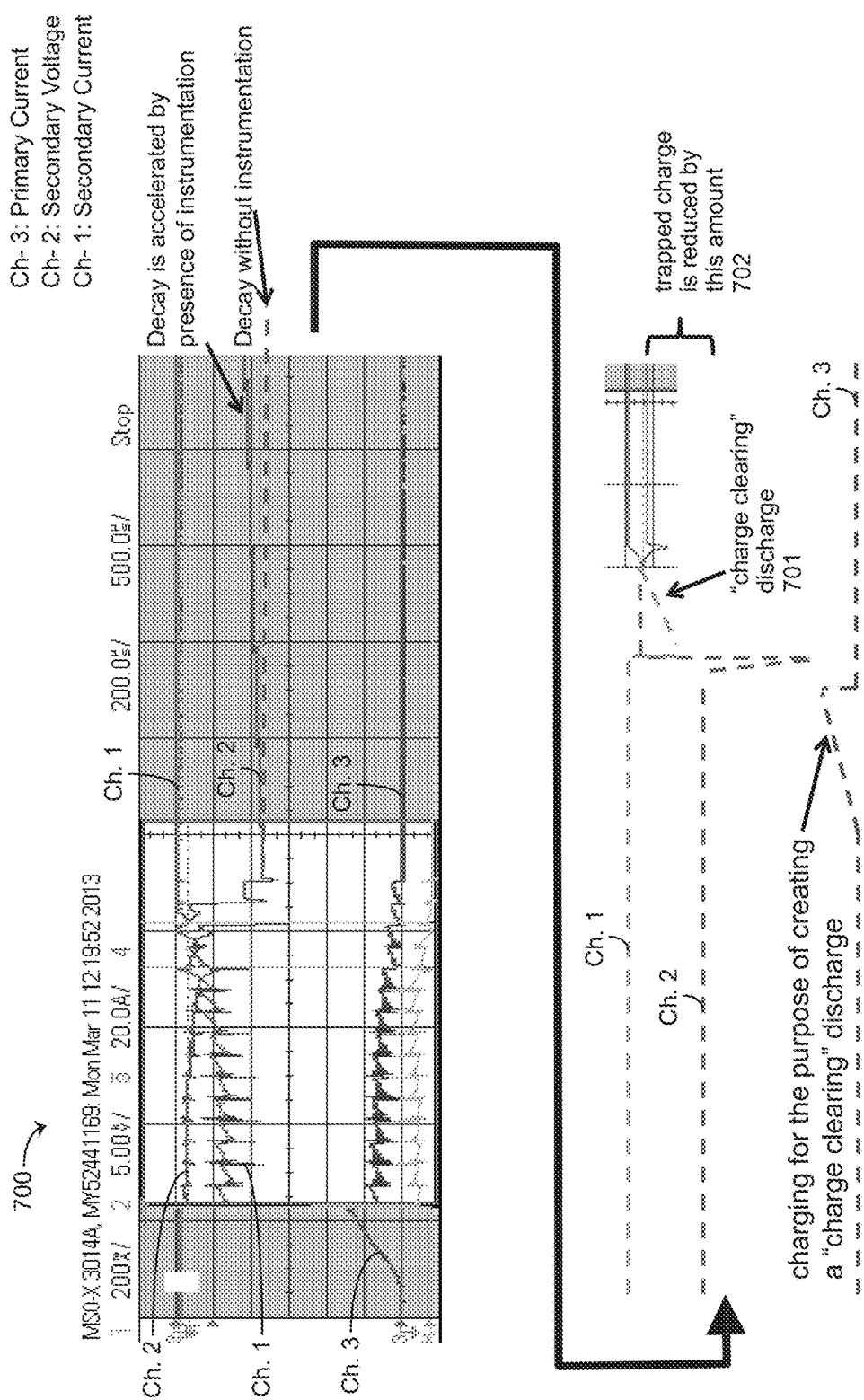
FIG. 7 is a graph depicting primary current, secondary current, and secondary voltage after a production of a small charge clearing discharge from an ignitor in a dual coil ignition system, according to an exemplary embodiment.

Referring now to FIG. 7, a graph 700 showing the result of a "trapped charge" clearing discharge during an exhaust stroke of the engine is shown, according to an example embodiment. In this example, the trapped charge is managed by the controller 150 providing a command to the ignitor to provide a spark during an acceptable engine time. The acceptable time may refer to a time that is relatively less likely to cause any damage to the engine. According to one embodiment, the acceptable time refers to any time during the exhaust stroke because there is a reduced chance of damage to the engine occurring if a combustible event is created by the additional spark (e.g., because the combustion gases and matter are being evacuated via the exhaust valve). According to one embodiment, the additional spark is provided at approximately 20 degrees (e.g., plus-or-minus five degrees) before top dead center compression during the exhaust stroke. However, in other embodiments, the additional spark may be provided at other crank angles during other strokes in order to minimize a chance of damage to the engine. Accordingly, in one example configuration, the primary coil is charged during the exhaust stroke and discharged prior to completion of the exhaust stroke. The discharging process causes an increase in the magnitude of the secondary voltage (i.e., more negative), which generates a spark from the ignitor. As seen in graph 700, at 701, the trapped charge clearing discharge (spark) has occurred. Relative to FIG. 3, the additional discharge results in a reduction of trapped charge by an amount 702. In turn, the additional firing of the ignitor during the exhaust stroke clears or substantially clears the trapped charge while minimizing the likelihood that a sparking event will cause damage to the engine cylinder due to unwanted combustion.

Figure 8A:
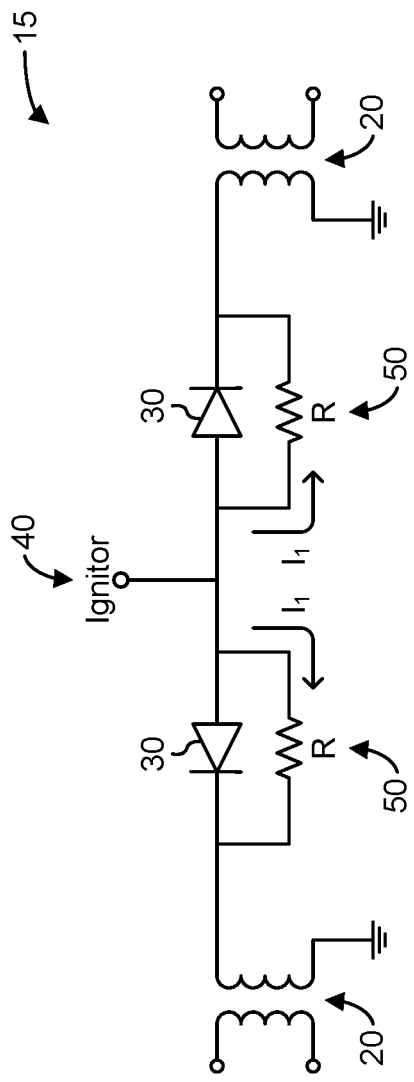
FIG. 8A is a circuit diagram of a dual coil ignition system with a controlled leakage circuit, according to an exemplary embodiment.
Figure 8B:
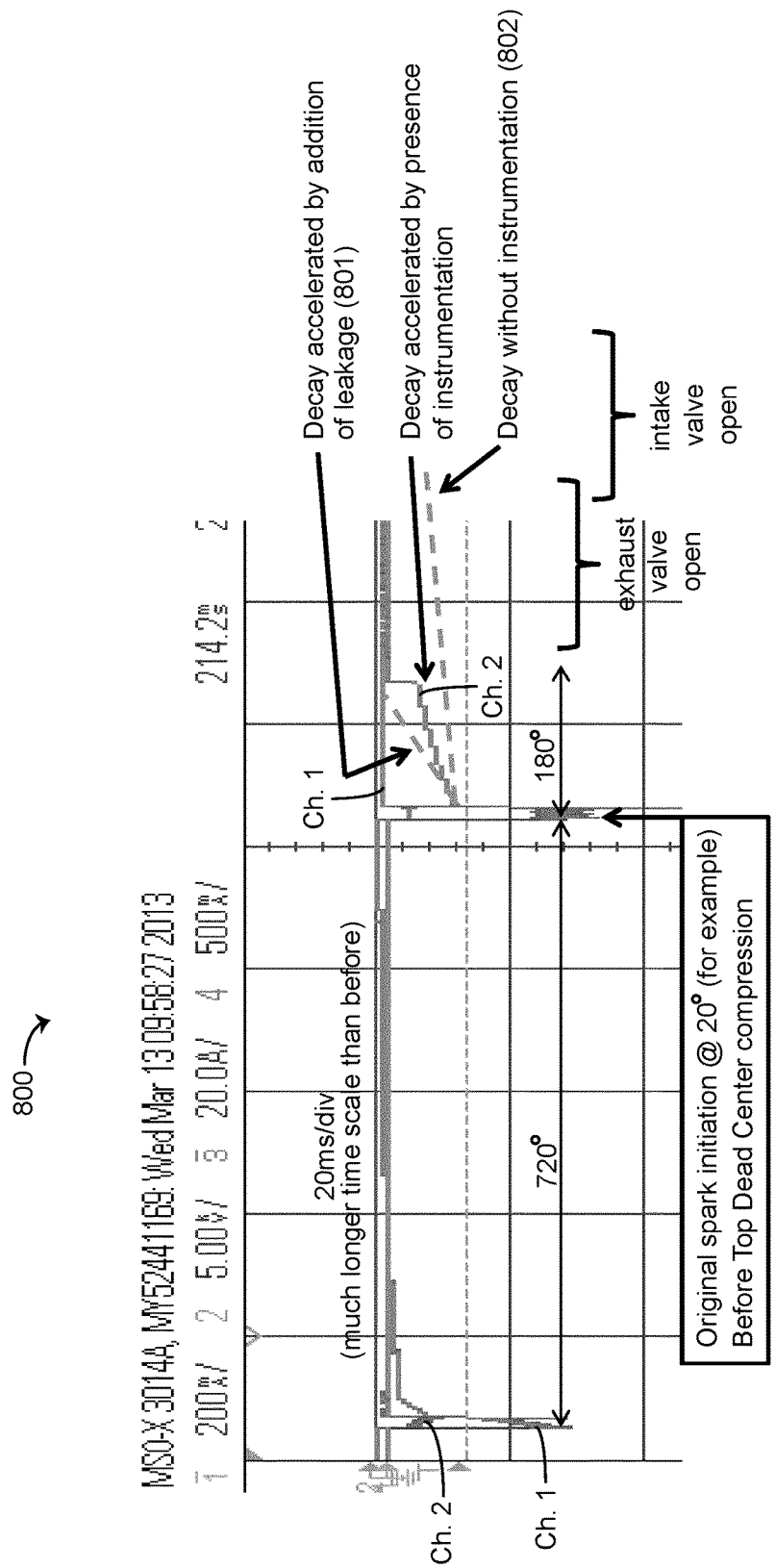
FIG. 8B is a graph depicting primary current, secondary current, and secondary voltage for a dual coil ignition system with a controlled leakage circuit, according to an exemplary embodiment.

FIGS. 5-7 depict residual charge clearing processes as commanded by the controller 150. These commands may be provided collectively or independently from one another. In some embodiments, additional structure may also be provided with the coil ignition system that is intended to remove or substantially remove the residual charge. Accordingly, referring next to FIGS. 8A-8B, a circuit diagram with a diode 30 in parallel with a resistor 50 for a dual coil ignition system 15 (FIG. 8A) and graph depicting the functionality of the system (FIG. 8B) are shown, according to exemplary embodiments. The dual coil ignition system 15 of FIG. 8A is configured to reduce the amount of trapped charge via a controlled residual charge leakage from the resistor-diode configuration. The current pathways, $I_1$ and $I_2$, provide a leakage route for trapped charge. "Controlled" leakage refers to the ability to choose a resistance of the resistors 50, to affect/control the amount of current, $I_1$ and $I_2$, that flows when the primary current goes to zero amperes (or, another blowout indicating circumstance such as a secondary current dropping below a threshold value). As shown, the "leakage" is controlled by using a semiconductor design that enhances the normally undesirable reverse current characteristic of the diode to drain charge away from the ignitor. This construction or structure reduces the amount of trapped charge by providing the trapped charge with path of least resistance to flow to and dissipate. Accordingly, prior to the intake stroke, the accumulated trapped charge may be removed to prevent an unintended combustion.

This functionality is shown in graph 800. In graph 800 of FIG. 8B, the degrees (720 degrees and 180 degrees) along the horizontal or x-axis refer to the crank angle position of a piston within the cylinder. As shown, the original spark is commanded at twenty degrees before top dead center at a crank angle of 720 degrees. The result of this spark causes the unintended consequence of a residual charge. However, the system of FIG. 8A, provides for a "controlled leak" of the trapped charge (line 801). As shown, the trapped charge was "controllably leaked" prior to the intake stroke to prevent unintended combustion. Line 801 depicts that the trapped charge has decayed (i.e., been reduced) at an accelerated rate due to the resistor-diode configuration of FIG. 8A. As shown, the line 801 has a steeper slope than line 802, which corresponds to the decay rate if nothing is done to clear the trapped charge. This indicates that the circuit diagram of FIG. 8A provides for a relatively increased rate of trapped charge dissipation relative to a coil system without such structure.

Figure 9:
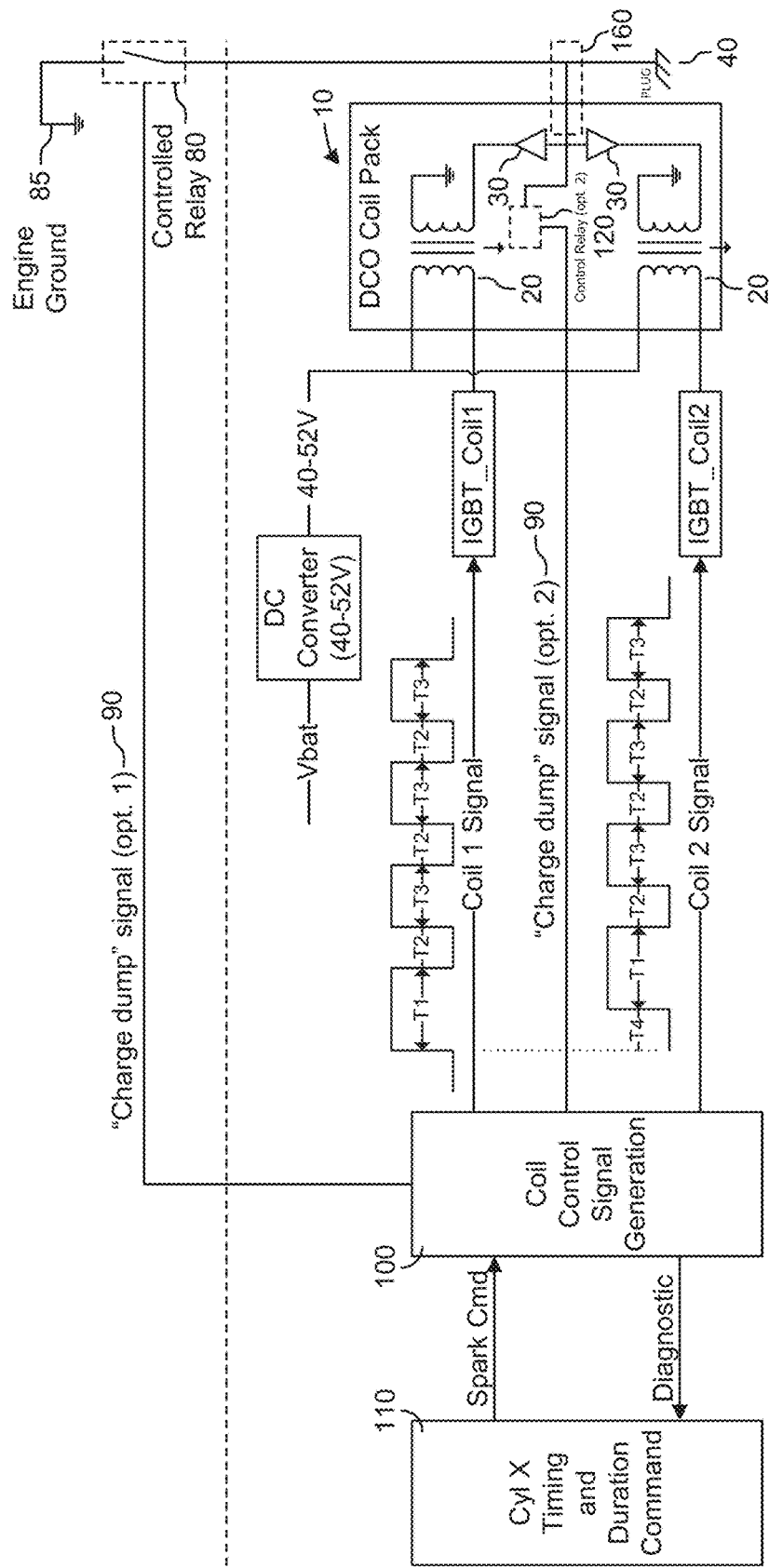
FIG. 9 is a circuit diagram of two pathways for clearing a residual charge in a dual coil ignition system, according to an exemplary embodiment.

Referring to FIG. 9, a circuit diagram of two circuits for reducing a residual charge amount in a dual coil ignition system is shown, according to an exemplary embodiment. Similar to FIGS. 8A-8B, the trapped charge in FIG. 9 is being provided with a circuit to facilitate bleed out to prevent accumulation of the residual charge. Like the structure of FIG. 8A, the structure depicted in FIG. 9 may also be utilized with the controller 150 described above, such that the commands described above may also be utilized with the structure shown in FIG. 9 (and FIG. 8A).

Referring more particularly to FIG. 9, according to the first example embodiment, an external circuit system for accumulated residual charge is shown. The external circuit system includes a controlled relay 80, a coil control signal generation device 100, and a cylinder timing and duration command device 110. According to one embodiment, the controlled relay 80, device 100, and device 110 may be communicably coupled to the controller 150. In other embodiments, the devices 100 and 110 may be a part of controller 150 (e.g., in module 157, etc.). The coil control signal generation device 100 provides the charge/discharge signal for each coil 20. The cylinder timing and duration command device 110 provides the spark command to the control signal generation device 100. The signal generation device 100 converts that signal to a command signal to provide commanded duration and timing of the spark from the ignitor. According to the first exemplary embodiment, the coil control signal generation device 100 provides a "charge dump" signal 90 to the controlled relay 80. When commanded, the controlled relay 80 actuates a switch to close the circuit from the ignitor 40, such that the residual voltage (i.e., trapped charge) between the high voltage diodes 30 and the ignitor 40 can freely flow to ground 85. As a result, the trapped charge is bled out and the possibility of a breakdown is decreased. Although this embodiment is described in regard to one ignitor 40 for one cylinder, as will be appreciated, this external circuit system can be replicated with each cylinder in an internal combustion engine utilizing a dual or multiple coil ignition system.

Also shown in FIG. 9 is a trapped charge switch system according to a second example embodiment. The switch system includes a relay 120, a control signal generation device 100, and the dual coil system 10. Rather than an external circuit, the relay 120 is internally and electrically coupled to the junction 160 where, typically, the charge is trapped. Accordingly, the coil control signal device 100 can provide a charge dump signal 90 to close the relay 120 thereby allowing the trapped charge to proceed to ground within the dual coil ("DCO") pack. Thus, FIG. 9 depicts two command actuated pathways for facilitating the removal of the trapped charge: one external to the DCO pack and one internal of the DCO pack. The internal embodiment for the DCO pack may facilitate relative easy installation of coil ignition systems with a trapped charge accumulation dissipation feature because a service technician or other installer may only need to couple to the DCO pack to the ignitor, power source, and controller 150. This may provide a retrofit aspect that is appealing to consumers, which may lead to an increase in sales potential for the system.

Figure 10:
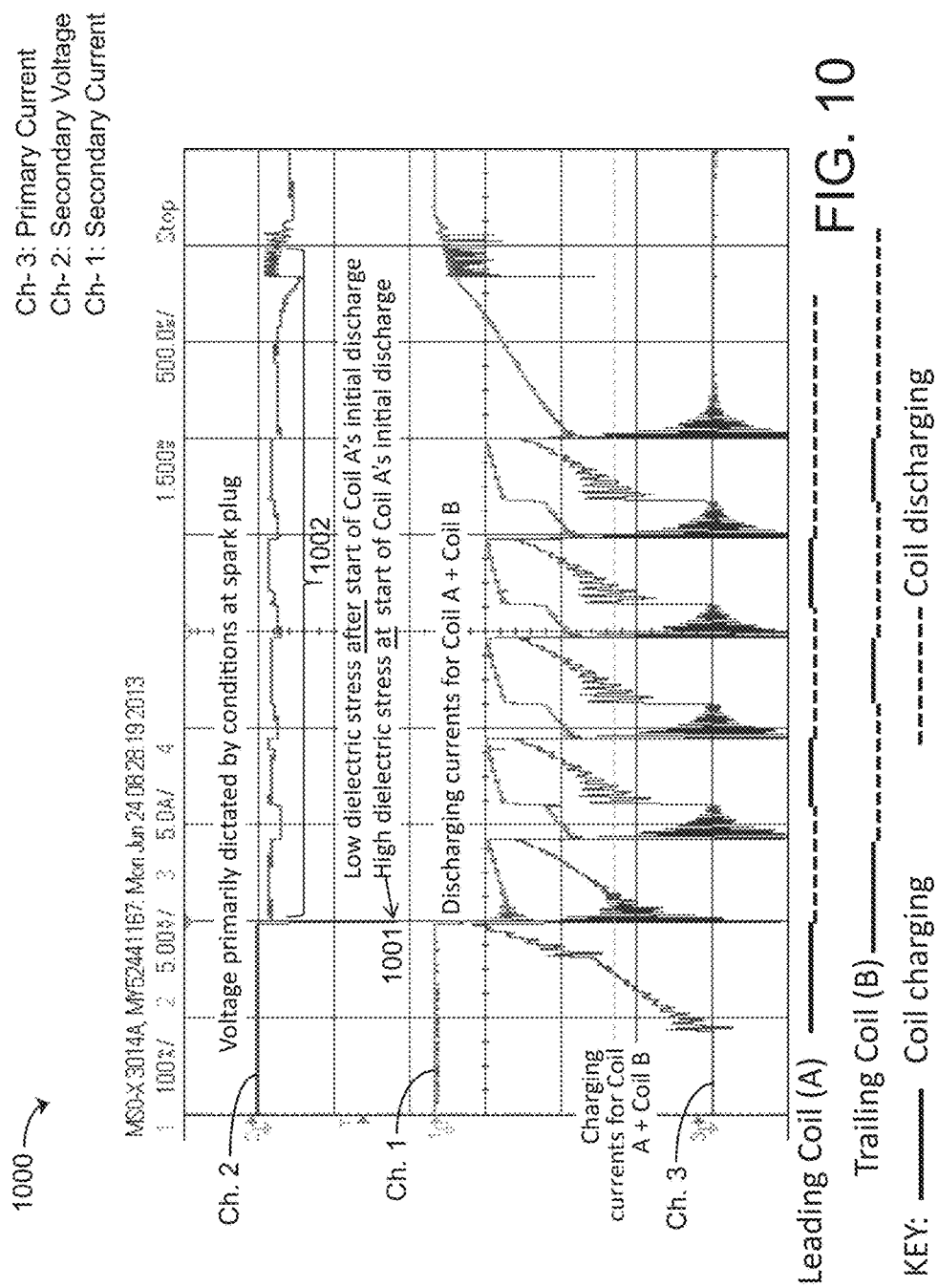
FIG. 10 is a graph depicting primary current, secondary current, and secondary voltage for a dual coil ignition system, according to an exemplary embodiment.

Referring next to FIG. 10, a graph 1000 depicting operation of a dual coil ignition system is shown, according to an exemplary embodiment. FIG. 10 represents the same operation conditions as depicted in FIG. 3 with Coil A and Coil B that comprise the "dual coil" system. The leading coil in FIG. 10 is Coil A. At point 1001, a high dielectric stress is experienced in Coil A. This high dielectric stress corresponds to the initiation of the spark at the ignitor. Approximately 9 kV are used to create the spark in this example. However, at 1002, approximately 2 kV are needed to sustain the spark. In other words, once the spark is initiated, a relatively lower voltage is required to sustain the spark. However, the higher voltage corresponds to a higher amount of stress on the components. With more stress, the likelihood of failure (e.g., breakdown, wear, etc.) increases. Accordingly, in the example of FIG. 10, because of the lower voltage, a relatively lower amount of dielectric stress is experienced in Coil B than Coil A due to Coil A being the leading coil (i.e., the coil used to initiate the spark).

Figure 11A:
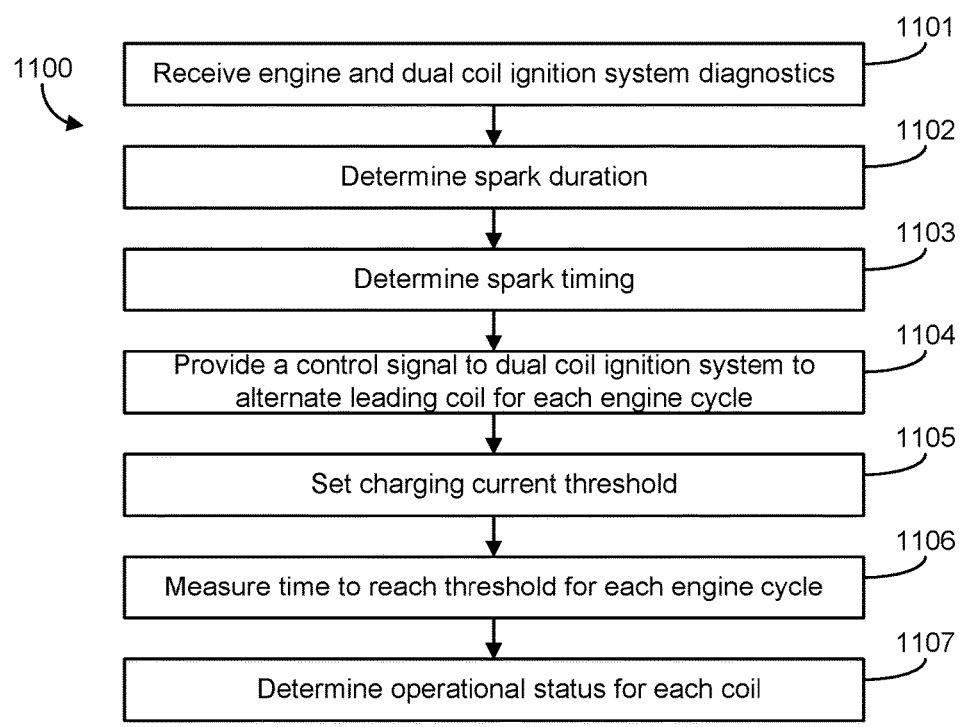
FIG. 11A is a graphical representation of a method for minimizing the dielectric stress and detecting a non-operational ignition coil in a dual coil ignition system, according to an exemplary embodiment.
Figure 11B:
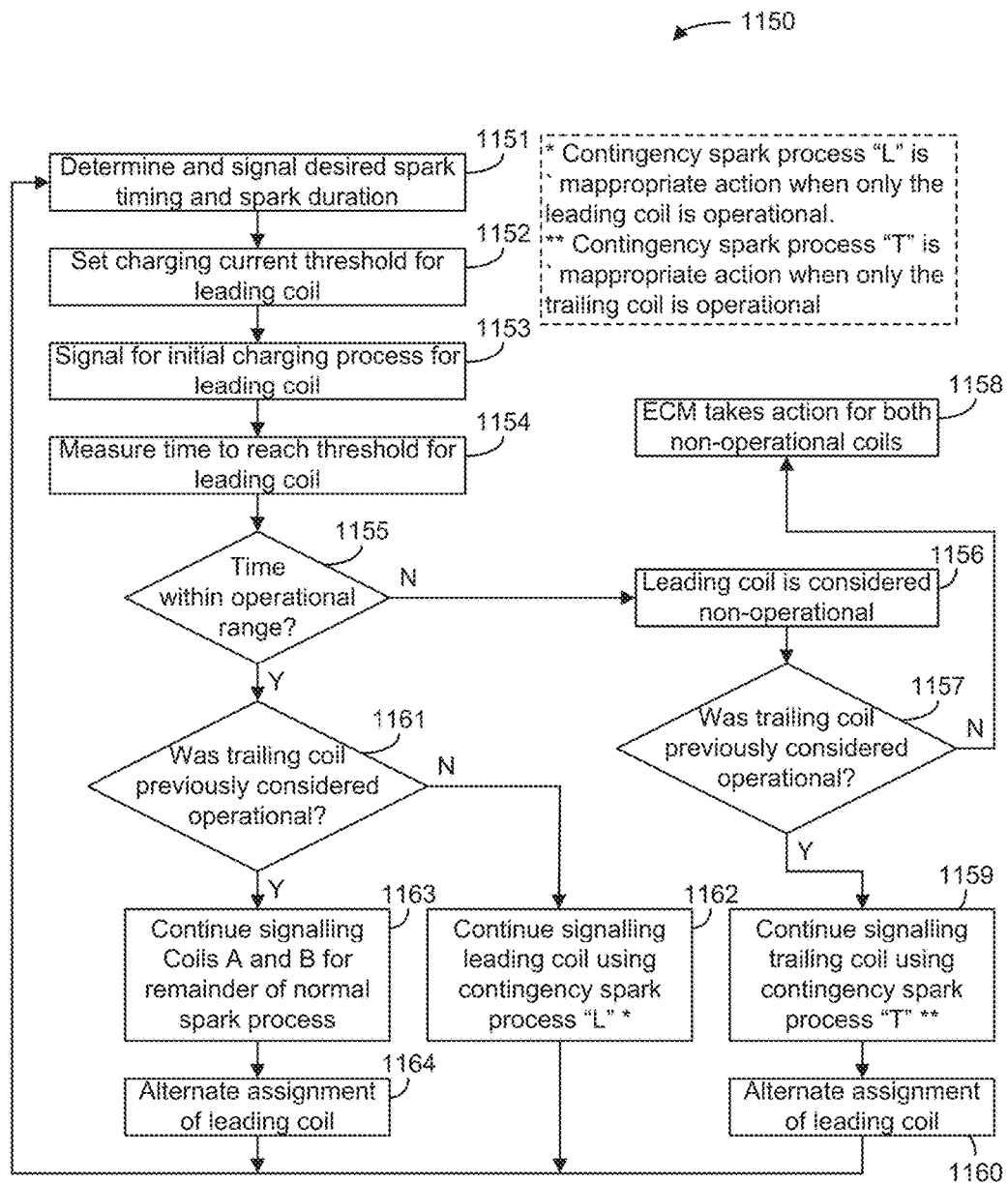
FIG. 11B is a graphical representation of a method of alternating the leading coil in a dual coil ignition system, according to an exemplary embodiment.

Referring to FIGS. 11A-11B, methods of alternating the leading coil in a dual coil ignition system are shown, according to exemplary embodiments. By alternating the leading coil, the high dielectric stress illustrated in FIG. 10 may be spread out between the two sets of coils, such that wear occurs relatively evenly. The alternating signal can be implemented using a coil control signal generation device 100 (FIG. 9), an ECM, or a separate control system electrically coupled to the dual coil ignition system (e.g., controller 150). In another embodiment, machine readable instructions configured to perform the methods of FIGS. 11A-11B can be stored in one or more memory devices that are coupled to one or more processors. The processors may be configured to execute the instructions to initiate the methods of FIGS. 11A-11B. As mentioned above, the alternating signal creates a dielectric stress sharing situation between the two coils, Coil A and Coil B. For example, the typical charge-discharge operating sequence for a dual coil ignition system is "A-B-A-B . . . ." Accordingly, the relatively higher amount of dielectric stress (in this example, 9 kV) is experienced repeatedly by Coil A and not Coil B. Thus, Coil A is likely to fail sooner than Coil B due to the repeated amount of stress put on it by the typical operation of the dual coil ignition system. However, the implementation of method 1100 creates a charge-discharge sequence of "A-B" then "B-A" and so on (based on engine cycle), that allows for the sharing of the higher amount of dielectric stress (at spark initiation) between the two coils. This may prolong the life of the system.

Figure 12:
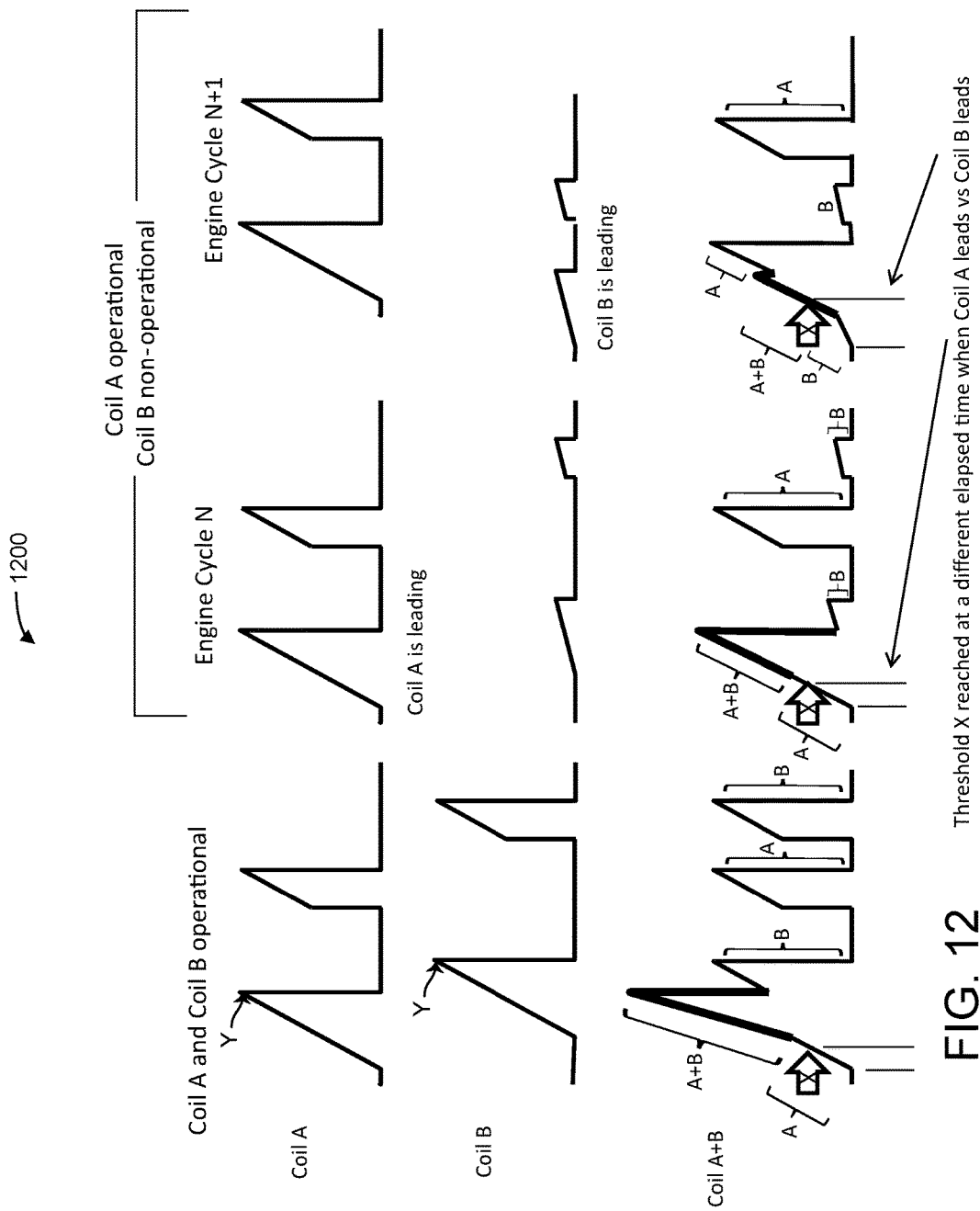
FIG. 12 is a graph of charging currents for operational and non-operational ignition coils in a dual coil ignition system, according to an exemplary embodiment.

In the example of FIG. 11A, a control signal generation device like that depicted in FIG. 9 may be used in connection with a dual coil ignition system that includes Coil A and Coil B. First, engine diagnostics are received (1101). Engine diagnostics can include an indication of a compression ratio of a cylinder, an air-to-fuel ratio of a cylinder, a likelihood of engine knock, an EGR percentage or amount, a fuel, an engine speed, etc. A spark duration is determined (1102) and a spark timing is determined (1103) based on the engine diagnostics. For example, if an increased percentage of EGR is added to an engine cylinder (which decreases the likelihood of combustion within the cylinder), the spark timing may be advanced and the spark duration may be increased in order to promote combustion within that cylinder. Accordingly, the control signal generation device may provide a signal to Coils A and B to obtain the necessary spark timing and duration. A control signal (e.g., command) is provided to the dual coil ignition system to alternate the leading coil in the charge/discharge process for each engine cycle (1104). A charging current threshold for one of the coils, such as the leading coil, is set (1105). The threshold corresponds to a normal operation level for the coil (e.g., a routine charge level sufficient for a spark-generating discharge). In some embodiments, the threshold may be significantly greater than the charge level sufficient for a spark-generating discharge while in other embodiments, the threshold may be more closely aligned with the charge level for generating a spark. Accordingly, each different application of the coil ignition system may correspond with different normal operation levels for the coils. If both of the coils are effectively equivalents (e.g., same charge capacity, same charge level, etc.), the threshold may be applicable with each coil. According to another embodiment, the coils may not be substantial equivalents. In this embodiment, which corresponds to method 1150 below, the threshold charging current is determined for just the leading coil. The time it takes to reach the current threshold is then measured for each engine cycle (1106). In another embodiment, the time to reach the threshold may be determined via one or more algorithms, lookup tables, processes, methods, and the like. Based on the time it takes to reach the charging current threshold, a determination is made whether each coil is operational or not (1107). If, on alternating engine cycles (e.g., Coil A leads on alternating engine cycles), the time it takes to reach the current threshold is longer than a predetermined threshold amount of time, then the controller 150 may determine that the coil leading on those engine cycles is non-operational (1107). If, on alternating engine cycles, the time it takes to reach the current threshold is less than a predetermined threshold amount of time, the then controller 150 may determine that the coil leading on those engine cycles is operational. This indicates that that coil is charging to the predefined amount within the predefined time (e.g., operating as desired). FIG. 12 shows a graph depicting a non-operational leading coil in a dual coil ignition system. According to an example embodiment, method 1100 may be performed continuously while the engine is in operation. In other embodiments, method 1100 may be performed periodically or at any interval commanded by an operator of the controller 150.

Referring back to FIG. 10, as shown, the coil initiating the spark experiences the highest amount of voltage and therefore dielectric stress. Thus, by alternating the charge/discharge process, Coil A and Coil B both experience high dielectric stress but on alternating engine cycles. The dielectric stress is therefore shared between them. This promotes relatively even wear between the coils, which may increase a life (e.g., a time before the coil becomes non-operational or fails) of the coils.

Referring next to FIG. 11B, a method 1150 of alternating the leading coil per engine cycle in a dual coil ignition system is shown, according to an exemplary embodiment. For the purposes of illustration, Coils A and B (of the dual coil system, with each coil comprising a primary and a secondary winding) are initially operational and one coil has been designated as the leading coil (it is immaterial as to which coil has been designated as the leading coil). As with FIG. 4B, the controller 150 determines and provides a signal for the spark timing and spark duration (1151). The controller 150 sets (or, in some embodiments, receives (e.g., from an operator of the system, etc.) a charging current threshold for the leading coil (1152). The leading coil charging current operating point (initial peak value; see FIG. 12, represented as tip, Y) is the charging current necessary to produce and initially sustain a spark. Based on the engine operating conditions, the required operating point can vary. For example, in relatively more difficult combustion conditions (e.g., a higher amount of EGR in the engine cylinder), a higher amount of charging current may be necessary to produce a relatively greater and longer spark to cause combustion. In the example of FIG. 12, "x" represents a threshold suitable for diagnostic purposes, which is typically less than the operating point. The controller 150 provides a signal to initiate the charging process of the leading coil (1153). The time it takes for the leading coil to charge to a preset threshold value is measured and recorded (1154). The controller 150 determines if the measured time is within the operational range (1155). If the time is not within the operational range, the leading coil is considered non-operational (1156). The controller 150 determines if the trailing coil was previously considered non-operational (1157). If the trailing coil was not previously considered non-operational, the ECM or controller 150 takes action for both non-operational coils (1158) because, if both coils are non-operational, a misfire of the engine is likely. The controller 150 may take such action as providing a signal in the form of a check engine light to a user. In another example, the controller 150 may attempt to shut the engine down in order to preserve the after-treatment system (e.g., catalytic converter). If the trailing coil was previously considered to be operational, then the controller 150 provides a signal to continue to only signal the operational trailing coil (1159), which results in the alternate assignment of leading coil (1160) (i.e., the leading coil, L, is replaced in favor of the operational trailing coil, T).

If the time measured for the leading coil to charge was determined to be within the operational range (step 1155) and the trailing coil was not previously considered to be operational, the ECM or controller 150 continues to only signal the leading coil (1162). However, If the time measured for the leading coil to charge was determined to be within the operational range (step 1155) and the trailing coil was previously considered to be operational, then the ECM or controller 150 continues to provide a signal to alternate the assignment of the leading coil (processes 1163-1164).

Referring to FIG. 12, a graph 1200 depicting the alternating charge/discharge operation for a dual coil ignition system is shown, according to an exemplary embodiment. By implementing method 1100, only one current threshold is needed to determine whether a coil is non-operational and the dielectric stress is distributed more evenly between Coil A and Coil B (rather than just coil A in the typical operation). As mentioned above, only one current threshold is needed when the coils are substantial equivalents (e.g., same number of turns, same gauge wire, etc.) in a dual coil ignition system. The x-axis in FIG. 12 is time. Accordingly, when Coil B is non-operational, the current threshold is reached at a later point in time. In this example, Coil B is not charging as fast as Coil A because it is non-operational. Accordingly, the control device (e.g., controller 150) can provide an indication to a user or other control module that Coil B is non-operational and needs to be fixed (step 1107 of method 1100) and, in some embodiments, continue to provide a signal for Coil A to lead. According to an alternate embodiment, the controller 150 provides a signal for only the operational coil, Coil A, to function thereby creating a single-coil ignition system. In sum, methods 1100 and 1150 provide for the sharing of dielectric stress between coils and an easier diagnostic (i.e., only one current threshold needed) of non-operational coils in a dual coil ignition system.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory ("RAM"), a read-only memory ("ROM"), an erasable programmable read-only memory (EPROM or Flash memory), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency ("RF"), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An apparatus, comprising:
a coil signal generator module structured to alternate a leading coil in a multi-coil ignition system each engine cycle; and
a charging module structured to determine whether a coil of the multi-coil ignition system is operational based on operation data regarding the coil relative to an operational threshold when the coil is the leading coil.

2. The apparatus of claim 1, wherein the operational threshold is a time threshold for reaching a charging current threshold and the operation data is a time duration to reach the charging current threshold.

3. The apparatus of claim 2, wherein the charging module is structured to determine the coil is non-operational based on the time duration being greater than or equal to the time threshold.

4. The apparatus of claim 2, wherein the charging module is structured to determine the coil is operational based on the time duration being less than the time threshold.

5. The apparatus of claim 2, wherein the charging current threshold includes at least one of a voltage and a current suitable for causing a spark from an ignitor of the multi-coil ignition system.

6. The apparatus of claim 1, wherein the coil ignition system includes a first set of primary and secondary coils, a second set of primary and secondary coils, and an ignitor electrically coupled to each of the first and second sets of primary and secondary coils.

7. A system, comprising:
a coil ignition system including:
a first set of primary and secondary coils;
a second set of primary and secondary coils; and
an ignitor electrically coupled to the first and second sets of primary and secondary coils; and
a controller communicably coupled to the coil ignition system, the controller structured to alternate between the first set and second set of primary and secondary coils as a leading coil for the coil ignition each engine cycle.

8. The system of claim 7, wherein the controller is structured to:
receive a charging current threshold for the leading coil;
receive a time duration for reaching the charging current threshold for the leading coil; and determine an operational status of the first set of coils and the second set of coils based on the time duration relative to an operational threshold time duration.

9. The system of claim 8, wherein the controller is structured to determine that at least one of the first set of coils and the second set of coils is non-operational based on the time duration for each set of coil being greater than the operational threshold time duration.

10. The system of claim 9, wherein responsive to the controller determining that at least one of the first set of coils and the second set of coils is non-operational, the controller is structured to determine whether the non-operational at least one of the first set of coils and the second set of coils was also previously determined to be non-operational.

11. The system of claim 10, wherein based on one of the at least one of the first set of coils and the second set of coils being determined to have been previously been determined to be non-operational, the controller is structured to stop alternating the leading coil and command the one of the first and second sets of coils not previously determined to be non-operational to be the leading coil.

12. The system of claim 7, wherein based on the first and second sets of coils being determined to be non-operational and each being previously determined to be non-operational, the controller is structured to activate an indicator light.

13. The system of claim 7, wherein the charging current threshold includes at least one of a voltage and a current suitable for causing a spark from the ignitor.

14. A method, comprising:
alternating, by a controller, a leading coil of a coil ignition system each engine cycle;
receiving, by the controller, a charging current threshold for the leading coil;
receiving, by the controller, a time duration for reaching the charging current threshold for a coil of the coil ignition system when the coil is the leading coil; and
determining, by the controller, an operational status of the coil based on the time duration for the coil relative to an operational threshold time duration.

15. The method of claim 14, wherein the operational status of the coil is determined to be non-operational based on the time duration being greater than or equal to the operational threshold time duration.

16. The method of claim 14, wherein responsive to a non-operational determination, further comprising activating, by the controller, an indicator light.

17. The method of claim 14, wherein the operational status of the coil is determined to be operational based on the time duration being less than the operational threshold time duration.

18. The method of claim 14, wherein the charging current threshold includes at least one of a voltage and a current suitable for causing a spark from an ignitor of the coil ignition system.

19. The method of claim 14, wherein the charging current threshold is used with each coil in the coil ignition system, such that different charging current thresholds for each coil in the coil ignition system are not used.

* * * * *